(12) United States Patent
Yoon et al.

(10) Patent No.: US 10,663,803 B2
(45) Date of Patent: May 26, 2020

(54) LIQUID CRYSTAL DISPLAY DEVICE COMPRISING FIRST, SECOND, AND THIRD PIXEL ELECTRODES EACH HAVING FIRST AND SECOND STEM PORTIONS THAT EXTEND FROM VERTICES OF A CENTRAL PATTERN

(71) Applicant: SAMSUNG DISPLAY CO., LTD., Yongin-si, Gyeonggi-do (KR)

(72) Inventors: Hyungguen Yoon, Hwaseong-si (KR); Jinsuek Kim, Daejeon (KR); Younhak Jeong, Cheonan-si (KR); Yunseok Lee, Asan-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 217 days.

(21) Appl. No.: 15/209,980

(22) Filed: Jul. 14, 2016

(65) Prior Publication Data

US 2017/0176822 A1    Jun. 22, 2017

(30) Foreign Application Priority Data

Dec. 18, 2015  (KR) .......................... 10-2015-0181654

(51) Int. Cl.
*G02F 1/1337* (2006.01)
*G02F 1/1343* (2006.01)
*G02F 1/1335* (2006.01)
*G02F 1/1362* (2006.01)

(52) U.S. Cl.
CPC .. *G02F 1/133707* (2013.01); *G02F 1/133514* (2013.01); *G02F 1/134309* (2013.01); *G02F 1/134336* (2013.01); *G02F 2001/134318* (2013.01); *G02F 2001/136222* (2013.01); *G02F 2201/121* (2013.01); *G02F 2201/123* (2013.01)

(58) Field of Classification Search
CPC ......... G02F 2001/134318; G02F 2001/136222
See application file for complete search history.

(56) References Cited

U.S. PATENT DOCUMENTS

| 7,768,597 B2 | 8/2010 | Chang |
| 2004/0095521 A1* | 5/2004 | Song ................. G02F 1/133514 349/61 |
| 2006/0208293 A1* | 9/2006 | Lim .................. G02F 1/133514 257/294 |

(Continued)

FOREIGN PATENT DOCUMENTS

| JP | 2015-79206 A | 4/2015 |
| KR | 10-2010-0077979 A | 7/2010 |

*Primary Examiner* — Paul C Lee
(74) *Attorney, Agent, or Firm* — Kile Park Reed & Houtteman PLLC

(57) ABSTRACT

A liquid crystal display device includes first, second, third, and fourth pixel electrodes, each including a stem portion and a branch portion to define a plurality of domains, a common electrode opposing each of the first, second, third, and fourth pixel electrodes, and a liquid crystal layer between each of the common electrodes and a corresponding one of the first through fourth pixel electrodes, wherein an overall planar area of the stem portion and the branch portion of the fourth pixel electrode is smaller than an overall planar area of the stem portion and the branch portion of each of the first through third pixel electrodes.

10 Claims, 13 Drawing Sheets

(56) References Cited

U.S. PATENT DOCUMENTS

2013/0101755 A1\* 4/2013 Lee .................. G02F 1/133707
                                                428/1.23
2014/0118411 A1   5/2014 Jang et al.
2015/0109567 A1   4/2015 Tago et al.

\* cited by examiner (a)  (b)

(a)  (b)

LIQUID CRYSTAL DISPLAY DEVICE COMPRISING FIRST, SECOND, AND THIRD PIXEL ELECTRODES EACH HAVING FIRST AND SECOND STEM PORTIONS THAT EXTEND FROM VERTICES OF A CENTRAL PATTERN

CROSS-REFERENCE TO RELATED APPLICATION

Korean Patent Application No. 10-2015-0181654, filed on Dec. 18, 2015, in the Korean Intellectual Property Office, and entitled: "Liquid Crystal Display Device," is incorporated by reference herein in its entirety.

BACKGROUND

1. Field

One or more embodiments described herein relate to a liquid crystal display ("LCD") device improved in terms of side visibility.

2. Description of the Related Art

A LCD device is a type of a flat panel display (FPD), which has found wide recent applications. The LCD device includes two substrates including two electrodes respectively formed thereon, and a liquid crystal layer interposed therebetween. Upon applying voltage to the two electrodes, liquid crystal molecules of the liquid crystal layer are rearranged, such that an amount of transmitted light may be adjusted.

Color coordinates of a LCD device may vary based on a viewing angle, and thus a color is viewed differently when viewed from the lateral side as compared to the color when viewed from the front. In this regard, typically when viewed from the lateral side, a color may lean toward yellow or red. Such a phenomenon of the color leaning toward yellow or red occurs due to birefringence of liquid crystals, and is affected by "$\Delta n \cdot d$" (n: effective refractive index, d: distance). As used herein. the distance "d" refers to a light path within a cell gap of the LCD device.

SUMMARY

Aspects of embodiments are directed to a liquid crystal display ("LCD") device improved in terms of side visibility in a white pixel.

In accordance with one or more embodiments, a liquid crystal display device comprises first, second, third, and fourth pixel electrodes, each including a stem portion and a branch portion to define a plurality of domains; a common electrode opposing each of the first, second, third, and fourth pixel electrodes; and a liquid crystal layer between each of the common electrodes and a corresponding one of the first through fourth pixel electrodes. An overall planar area of the stem portion and the branch portion of the fourth pixel electrode may be smaller than an overall planar area of the stem portion and the branch portion of each of the first through third pixel electrodes.

The stem portion may include a first stem portion and a second stem portion.

An overall planar area of the first stem portion of the fourth pixel electrode may be smaller than an overall planar area of the first stem portion of each of the first through third pixel electrodes.

An overall planar area of the second stem portion of the fourth pixel electrode may be smaller than an overall planar area of the second stem portion of each of the first through third pixel electrodes.

The stem portion may include a third stem portion connecting end portions of the first stem portion and the second stem portion to define an exterior of the first through fourth pixel electrodes.

Each of the first through third pixel electrodes may include central patterns at a center of each respective one of the stem portions of the first, second, and third pixel electrodes.

The fourth pixel electrode may include a central pattern at a center of the stem portion of the fourth pixel electrode, and an overall planar area of the central pattern of the fourth pixel electrode may be smaller than an overall planar area of the central pattern of one of the first, second, and third pixel electrodes.

The liquid crystal display device may further comprise a substrate including first, second, third, and fourth pixels on which the first, second, third, and fourth pixel electrodes are disposed, respectively; first, second, and third color filters in the first, second, and third pixels, respectively; and a color filter pattern in the fourth pixel. The color filter pattern may include a same material as that included in at least one of the first, second, and third color filters.

The color filter pattern may have a column shape, and has a smaller planar area than a planar area of the fourth pixel.

In accordance with one or more embodiments, a liquid crystal display device comprises first, second, third, and fourth pixel electrodes each including a stem portion and a branch portion to define a plurality of domains; a common electrode opposing each of the first, second, third, and fourth pixel electrodes, and having an aperture corresponding to a respective stem portion; and a liquid crystal layer between each of the common electrodes and a corresponding one of the first through fourth pixel electrodes. An overall planar area of the aperture of the common electrode corresponding to the fourth pixel electrode may be larger than each respective overall planar area of an apertures of the common electrode corresponding to the first, second, and third pixel electrodes.

The aperture of the common electrode may include a first aperture and a second aperture.

A planar area of the first aperture of the common electrode corresponding to the fourth pixel electrode may be larger than each respective planar area of the first apertures of the common electrode corresponding to the first, second, and third pixel electrodes.

A planar area of the second aperture of the common electrode corresponding to the fourth pixel electrode may be larger than each respective planar area of the second apertures of the common electrode corresponding to the first, second, and third pixel electrodes.

A width of at least one of the first aperture and the second aperture may increase toward the center of the aperture in the fourth pixel electrode.

Widths of respective ones of the first aperture and the second aperture may be in a range of about 3.9 μm to about 13.5 μm.

Widths of respective portions of the first aperture and the second aperture that are most adjacent to the center of the aperture of the common electrode may be in a range of about 12.5 μm to about 13.5 μm, and widths of respective portions of the first aperture and the second aperture that are most apart from the center of the aperture of the common electrode may be in a range of about 3.9 μm to about 5.9 μm.

The common electrode may have a central aperture at the center of the aperture, and a planar area of the central aperture of the common electrode corresponding to the fourth pixel electrode may be larger than each respective planar area of the central apertures of the common electrode corresponding to the first, second, and third pixel electrodes.

In accordance with one or more embodiments, a liquid crystal display device comprises first, second, third, and fourth pixel electrodes each including a stem portion and a branch portion to define a plurality of domains; a common electrode opposing each of the first, second, third, and fourth pixel electrodes, and having an aperture corresponding to a respective stem portion; and a liquid crystal layer between each of the common electrodes and a corresponding one of the first through fourth pixel electrodes. An overall planar area of the fourth pixel electrode and the common electrode corresponding to the fourth pixel electrode may be smaller than an overall planar area of one of the first, second, and third pixel electrodes and the common electrode corresponding to the one of the first, second, and third pixel electrodes.

An overall planar area of the stem portion and the branch portion of the fourth pixel electrode may be less than an overall planar area of the stem portion and the branch portion of one of the first, second, and third pixel electrodes.

A planar area of the aperture of the common electrode corresponding to the fourth pixel electrode may be larger than each respective planar area of the apertures of the common electrode corresponding to the first, second, and third pixel electrodes.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
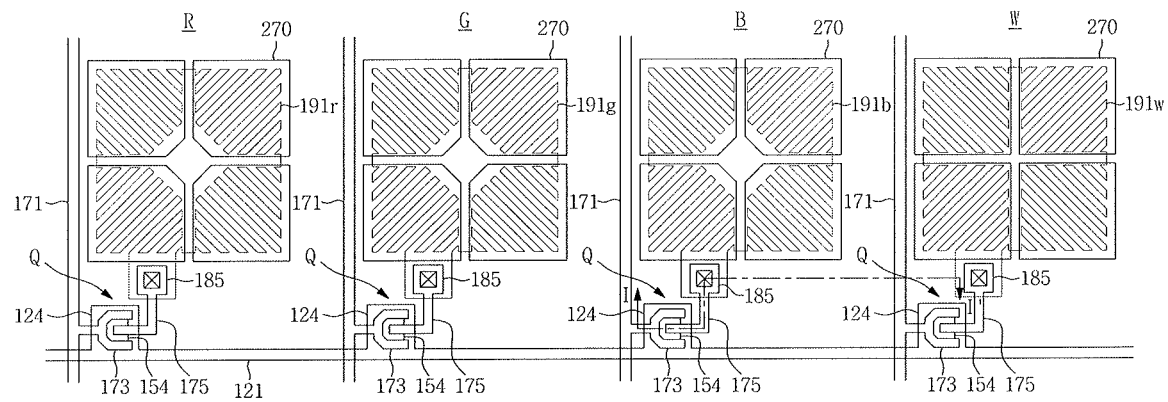
FIG. 1 illustrates a schematic plan view of a pixel according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case that a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments and may be modified according to the relevant art and the intention of an applicant. Therefore, the terms used herein should be interpreted as having a meaning that is consistent with their meanings in the context of the present disclosure, and is not intended to limit. As used herein, the singular forms "a," "an," and "the" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, descriptions pertaining to a liquid crystal display ("LCD") device according to a first exemplary embodiment will be described with respect to FIGS. 1, 2, and 3.

FIG. 1 illustrates a schematic plan view of a pixel according to the first exemplary embodiment. FIG. 2 illustrates a cross-sectional view taken along line I-I' of FIG. 1. FIG. 3 illustrates schematic plan views of a first pixel electrode 191r and a fourth pixel electrode 191w according to the first exemplary embodiment.

Figure 2:
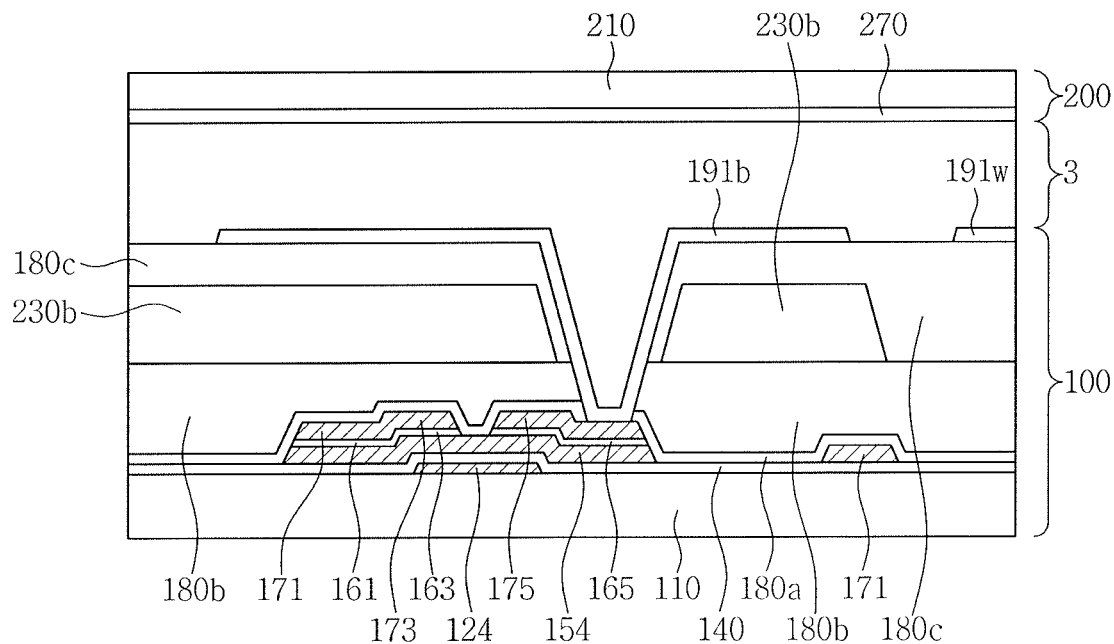
FIG. 2 illustrates a cross-sectional view taken along line I-I' of FIG. 1.

With reference to FIGS. 1 and 2, at least one pixel includes at least one of first, second, third, and fourth pixels R, G, B, and W. The first, second, and third pixels R, G, and B may correspond to a red pixel, a green pixel, and a blue pixel, and the fourth pixel W may be a transparent pixel or a white pixel.

The first, second, and third pixels R, G, and B respectively include pixel electrodes 191 having the same structure, and share a common electrode 270 which has the same structure in each of the first, second, and third pixels R, G, and B. Accordingly, hereinafter, the first pixel R will be described in comparison with the fourth pixel W, which includes a pixel electrode 191 and a common electrode 270 structure that are different from those of the pixel electrode 191 and the common electrode 270 of the first, second, and third pixels R, G, and B, by way of example. Hereinafter, for ease of description, it is assumed that the first, second, third, and fourth pixels R, G, B, and W are a red pixel, a green pixel, a blue pixel, and a white pixel, respectively.

In an exemplary embodiment, the LCD device according to the first exemplary embodiment includes at least one pixel 10. A plurality of pixels 10 may be arranged on a first substrate 110 in a matrix pattern, i.e., in a plurality of rows and a plurality of columns. The pixels 10 include the red pixel R, the green pixel G, the blue pixel B, and the white pixel W. For example, as illustrated in FIG. 1, the red pixel R, the green pixel G, the blue pixel B, and the white pixel W may be arranged in a 1×4 matrix to define a single pixel 10.

The pixel 10 is depicted as a 1×4 matrix in FIG. 1, but is not limited thereto. The pixel 10 may be provided in any suitable arrangement, e.g., a 2×2 matrix. In addition, the pixel 10 may be modified into any suitable shape, e.g., a linear shape, a V-like shape, or a Z-like shape. A gate line 121 and a data line 171 are arranged in a matrix to define the plurality of pixels 10.

Configurations of the LCD device will be described in detail.

With reference to FIGS. 1 and 2, the LCD device according to the first exemplary embodiment may include a lower display substrate 100 and an upper display substrate 200 opposing each other, and a liquid crystal layer 3 interposed between the lower display substrate 100 and the upper display substrate 200.

Hereinafter, descriptions pertaining to the lower display substrate 100 will be described.

A plurality of gate lines 121 may be formed on the first substrate 110. The gate lines 121 transmit a gate signal and substantially extend in a transverse direction. Each of the gate lines 121 may include a plurality of gate electrodes 124.

A gate insulating layer 140 may be formed on the gate line 121. The gate insulating layer 140 may include or be formed of an inorganic insulating material, e.g., silicon nitride ($SiN_x$) or silicon oxide ($SiO_x$).

A plurality of semiconductors 154 may be formed on the gate insulating layer 140. The semiconductor 154 may include a protruding portion extending along the gate electrode 124. In addition, the semiconductor 154 may only be disposed on the gate electrode 124.

The semiconductor 154 may include amorphous silicon, poly-crystalline silicon, or an oxide semiconductor. The oxide semiconductor may include at least one of, e.g., zinc (Zn), gallium (Ga), indium (In), and tin (Sn).

For example, the oxide semiconductor may include or be formed of an oxide semiconductor material such as an oxide based on zinc (Zn), gallium (Ga), tin (Sn) or indium (In), or a composite oxide, e.g., zinc oxide (ZnO), indium-gallium-zinc oxide ($InGaZnO_4$), indium-zinc oxide (In—Zn—O), and zinc-tin oxide (Zn—Sn—O). For example, the oxide semiconductor may include an IGZO-based oxide including indium (In), gallium (Ga), zinc (Zn), and oxygen (O). In another example, the oxide semiconductor may include an In—Sn—Zn—O-based metal oxide, an In—Al—Zn—O-based metal oxide, a Sn—Ga—Zn—O-based metal oxide, an Al—Ga—Zn—O-based metal oxide, a Sn—Al—Zn—O-based metal oxide, an In—Zn—O-based metal oxide, a Sn—Zn—O-based metal oxide, an Al—Zn—O-based metal oxide, an In—O—based metal oxide, a Sn—O-based metal oxide, and a Zn—O-based metal oxide.

A plurality of ohmic contact members 161, 163, and 165 may be formed on the semiconductor 154 and the protruding portion of the semiconductor 154. The ohmic contact members 161, 163, and 165 may be disposed on the semiconductor 154, respectively forming pairs with respect to the gate electrode 124. The ohmic contact members 161, 163, and 165 may include or be formed of, e.g., silicide, or n+ hydrogenated amorphous silicon doped with n-type impurities, such as phosphorus, at high concentration.

A data conductor including a plurality of data lines 171 and a plurality of drain electrodes 175 may be formed on the ohmic contact members 161, 163, and 165. The data lines 171 transmit a data signal, and substantially extend in a longitudinal direction to intersect the gate lines 121. Each of the data lines 171 includes a plurality of source electrodes 173 which extend toward the gate electrode 124. The drain electrode 175 has a bar-shaped end portion which opposes the source electrode 173 and another end portion which has a larger planar area than that of another portion thereof, with respect to the gate electrode 124.

The gate electrode 124, the source electrode 173, and the drain electrode 175, along with the semiconductor 154, define a thin film transistor Q which is a switching element. The semiconductor 154 may have substantially the same planar shape as those of the data line 171, the drain electrode 175, and the ohmic contact layers 161, 163, and 165 therebelow.

For example, a first insulating layer 180a may be disposed over the data conductor, e.g., the data line 171 and the drain electrode 175, and an exposed portion of the semiconductor 154. The first insulating layer 180a may include or be formed of an organic insulating material or an inorganic insulating material. In another example, the first insulating layer 180a may be omitted.

A second insulating layer 180b may be formed over the first insulating layer 180a. The second insulating layer 180b may include or be formed of an organic material. The second insulating layer 180b is disposed over the gate line 121, the data line 171, and the thin film transistor Q.

Figure 25:
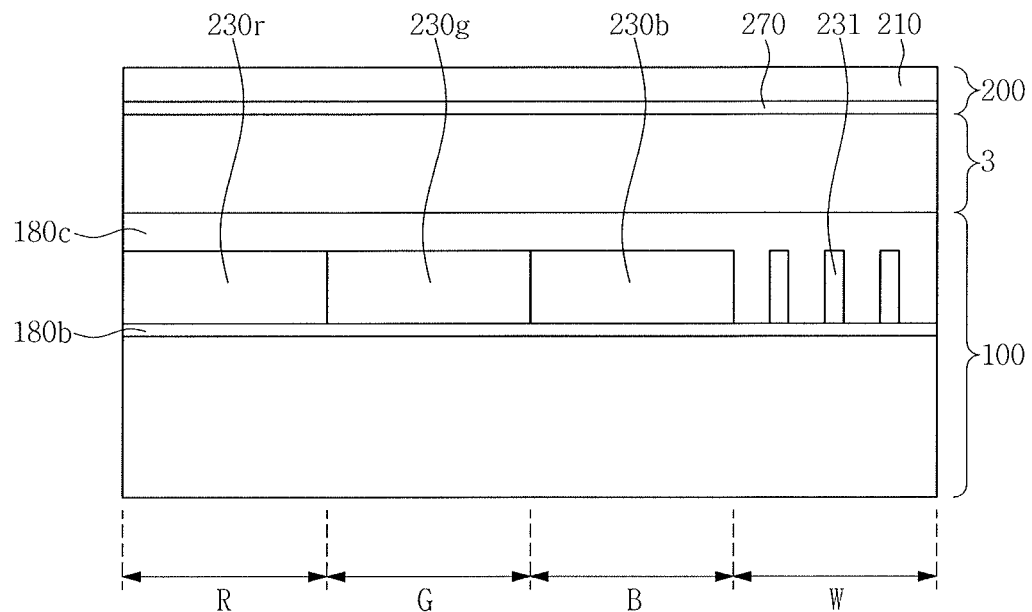
FIG. 25 illustrates a schematic cross-sectional view of a color filter according to a twelfth exemplary embodiment.
Figure 26:
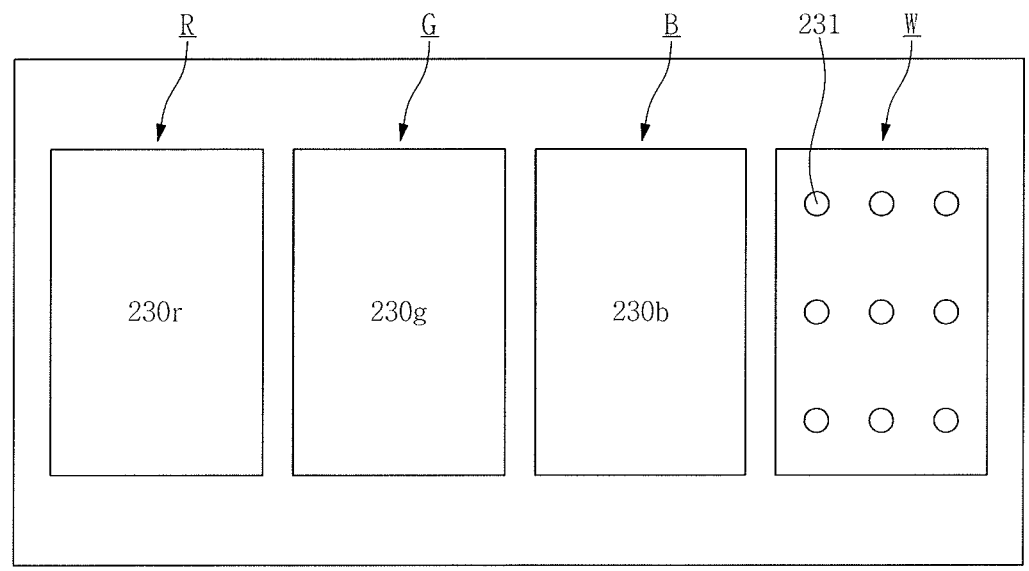
FIG. 26 illustrates a schematic plan view of the color filter according to the twelfth exemplary embodiment.

A color filter 230, illustrated in FIGS. 25 and 26, may be disposed on the second insulating layer 180b. In an exemplary embodiment, while a blue color filter 230b overlaps the blue pixel B, the color filter 230 is absent in the white pixel W. The color filter 230 may distinctly display one of primary colors. Examples of the primary colors may include, e.g., three primary colors of red, green, and blue, or colors of yellow, cyan, and magenta. The color filter 230 may include or be formed of an organic material. Descriptions pertaining to the color filter 230 will be provided further below with reference to FIGS. 25 and 26.

For example, a third insulating layer 180c, including an insulating material, may be disposed over the color filter 230 and the second insulating layer 180b. In another example, the third insulating layer 180c may be omitted.

The pixel electrode 191 may be disposed over the third insulating layer 180c. The pixel electrode 191 is electrically connected to the drain electrode 175 through a contact hole 185 to receive a data voltage. The pixel electrode 191 that receives the data voltage, along with the common electrode 270 that receives a common voltage, generates an electric field over the liquid crystal layer 3.

Hereinafter, descriptions pertaining to the upper display substrate 200 will be provided.

A light blocking member, also referred to as a black matrix, may be formed over portions of the second substrate 210 corresponding to the gate line 121, the data line 171, and the thin film transistor Q. The light blocking member serves to significantly reduce or prevent light leakage. The light blocking member has a plurality of apertures, opposing the pixel electrode 191, which have shapes substantially the same as the pixel electrode 191. That is, the light blocking member may have a portion corresponding to the gate line 121 and the data line 171, and a portion corresponding to the thin film transistor Q.

The common electrode 270 may be formed over the second substrate 210. The common electrode 270 may include or be formed of a transparent conductive material, e.g., ITO or IZO. The common electrode 270, having a planar shape, may be formed as a whole plate over an entire surface of the second substrate 210.

Alignment layers may be formed over interior surfaces of the lower display substrate 100 and the upper display substrate 200, respectively. Two polarizers may be formed over exterior surfaces of the lower display substrate 100 and the upper display substrate 200, respectively, and transmission axes of the two polarizers may be perpendicular, or alternatively, parallel to each other. In the case of a respective LCD device, one of the two polarizers may be omitted.

The liquid crystal layer 3 between the lower display substrate 100 and the upper display substrate 200 includes liquid crystal molecules, and the liquid crystal molecules may be aligned so that a major axis thereof is horizontal with respect to surfaces of the lower display substrate 100 and the upper display substrate 200, while an electric field is absent between the lower display substrate 100 and the upper display substrate 200. The liquid crystal layer 3 may have a positive dielectric anisotropy, and alternatively, may have a negative dielectric anisotropy. The liquid crystal molecules of the liquid crystal layer 3 may be aligned to have a pre-tilt in a predetermined direction, and the pre-tilt direction of the liquid crystal molecules may vary based on the dielectric anisotropy of the liquid crystal layer 3. The pixel electrode 191 that receives the data voltage, along with the common electrode 270 that receives the common voltage, generates an electric field over the liquid crystal layer 3, whereby an alignment direction of the liquid crystal molecules of the liquid crystal layer 3 is determined and a corresponding image is displayed.

In the LCD device configured in a manner described hereinabove, since the color filter 230 is absent in the white pixel W, a step difference may be generated in the white pixel W. The step difference generated in the white pixel W may lead to degraded side visibility of the LCD device, which will be described further hereinbelow.

Referring to voltage (V)-transmittance (T) curves respectively corresponding to blue, red, and green colors, although light is transmitted through the same liquid crystal layer, a variation degree of polarization varies based on a wavelength of light, and thus a shape of the V-T curve varies according to color. For example, the V-T curve of the blue color steeply decreases, as compared to the V-T curve of the red or green color. In this regard, a difference among the shapes of the V-T curves becomes bigger in accordance with an increase of "Δn·d" (n: effective refractive index, d: distance).

In detail, a light path of light transmitted through the liquid crystal layer 3, which is viewed from the lateral side, is longer than a light path of light transmitted through the liquid crystal layer 3, which is viewed from the front. Thus, "Δn·d" of the light viewed from the lateral side is greater than "Δn·d" of the light viewed from the front. Accordingly, an amount of light having a green or red color, as compared to an amount of light having a blue color, relatively increases as viewed more from the lateral side, such that an overall image may lean toward yellow or red. Such a phenomenon of the color leaning toward yellow or red occurs due to the birefringence of liquid crystals described hereinabove. Accordingly, due to the step difference generated in the white pixel W, a value of the distance "d" increases, such that the side visibility of the white pixel W may be degraded.

In an attempt to address such an issue, in the LCD device according to the first exemplary embodiment, an overall planar area of a stem portion 194w and a branch portion 199w of the fourth pixel electrode 191w is larger than that of a stem portion 194r and a branch portion 199r of one of first, second, and third pixel electrodes 191r, 191g, and 191b. The pixel electrode 191 will be described further in detail with reference to FIG. 3.

In detail, the first, second, and third pixel electrodes 191r, 191g, and 191b are disposed in the red pixel R, the green pixel G, and the blue pixel B, respectively, and the fourth pixel electrode 191w is disposed in the white pixel W. Structures of respective ones of the first, second, and third pixel electrodes 191r, 191g, and 191b are the same as one another and different from a structure of the fourth pixel electrode 191w. Accordingly, a comparison between the first pixel electrode 191r and the fourth pixel electrode 191w will be described, for ease of description.

Figure 3:
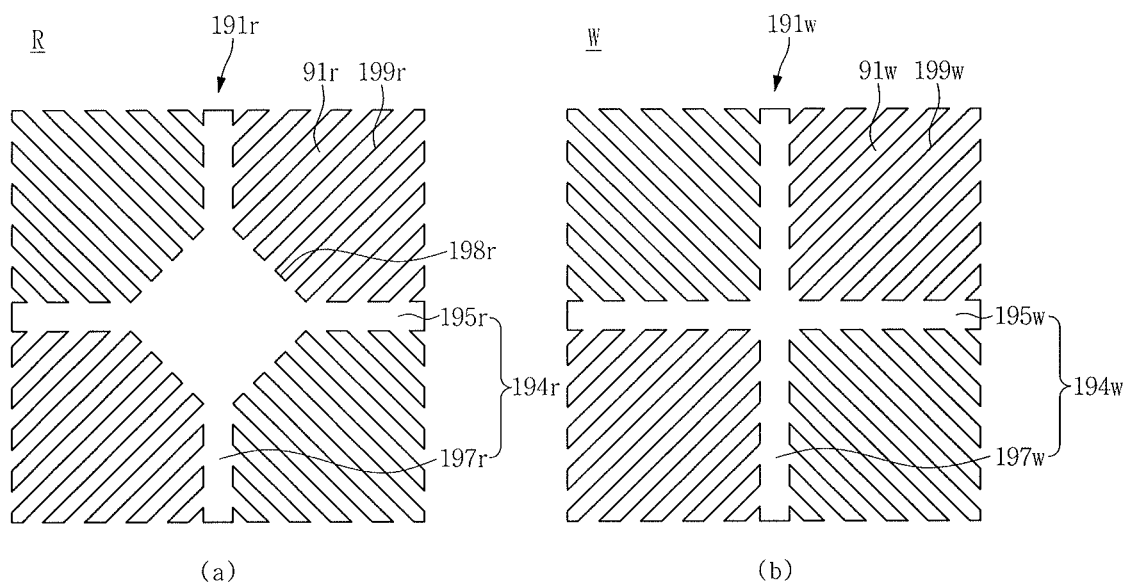
FIG. 3 illustrates schematic plan views of a first pixel electrode and a fourth pixel electrode according to the first exemplary embodiment.

Referring to FIG. 3, the first pixel electrode 191r and the fourth pixel electrode 191w include the stem portions 194r and 194w, respectively, and the branch portions 199r and 199w, respectively, which define a plurality of domains. The common electrode 270 opposes the first, second, third, and fourth pixel electrodes 191r, 191g, 191b, and 191w.

The first pixel electrode 191r and the fourth pixel electrode 191w, each having an overall quadrangular shape, respectively include the stem portions 194r and 194w, each having a cross-shape, which include first stem portions 195r and 195w and second stem portions 197r and 197w, respectively. The first pixel electrode 191r and the fourth pixel electrode 191w each are divided into four sub-areas by corresponding ones of the first stem portions 195r and 195w and the second stem portions 197r and 197w, and include the plurality of branch portions 199r and 199w formed in each of the sub-areas, respectively. Fine slits 91r and 91w, at which an electrode is removed, are defined among adjacent ones of the plurality of branch portions 199r and 199w, respectively.

The first stem portions 195r and 195w of the first pixel electrode 191r and the fourth pixel electrode 191w may extend substantially parallel to the gate line 121, and the second stem portions 197r and 197w of the first pixel electrode 191r and the fourth pixel electrode 191w may extend substantially parallel to the data line 171.

The branch portions 199r and 199w in upper-left sub-areas among the corresponding four sub-areas of the first pixel electrode 191r and the fourth pixel electrode 191w extend diagonally toward an upper-left direction from the first stem portions 195r and 195w or the second stem portions 197r and 197w, respectively. The branch portions 199r and 199w in upper-right sub-areas thereamong extend diagonally toward an upper-right direction from the first stem portions 195r and 195w or the second stem portions 197r and 197w, respectively. The branch portions 199r and 199w in lower-left sub-areas thereamong extend diagonally toward a lower-left direction from the first stem portions 195r and 195w or the second stem portions 197r and 197w, respectively, and the branch portions 199r and 199w in lower-right sub-areas thereamong extend diagonally toward a lower-right direction from the first stem portions 195r and 195w or the second stem portions 197r and 197w, respectively.

In an exemplary embodiment, the first pixel electrode 191r, dissimilar with respect to the fourth pixel electrode 191w, further includes a central pattern 198r which is an electrode at a central portion of the stem portion 194r. The central pattern 198r may have a polygonal shape, e.g., a lozenge shape, including four linear sides respectively positioned at the four sub-areas of the first pixel electrode 191r. Vertices of the central pattern 198r may be positioned on the stem portion 194r of the first pixel electrode 191r. In the case that the first pixel electrode 191r includes the central pattern 198r, the capability of controlling liquid crystals is improved by virtue of a fringe field generated by edge sides of the central pattern 198r, and thereby transmittance of the LCD device, may further be improved.

As such, since only the first, second, and third pixel electrodes 191r, 191g, and 191b include the central pattern 198r, while the fourth pixel electrode 191w does not include the central pattern 198r, an overall planar area of the stem portion 194w and the branch portion 199w of the fourth pixel electrode 191w is less than that of the stem portion 194r and the branch portion 199r of one of the first, second, and third pixel electrodes 191r, 191g, and 191b. As the planar area of the fourth pixel electrode 191w is reduced, a planar area of the fine slit 91w of the fourth pixel electrode 191w increases. As the planar area of the fine slit 91w increases, an intensity of a fringe field between the fourth pixel electrode 191w and the common electrode 270 is reduced. As the fringe field has a reduced intensity, an effective refractive index of the white pixel 191w decreases. Thus, as described hereinabove, in accordance with the decrease of the effective refractive index which affects side visibility, the side visibility of the white pixel W may be improved.

Hereinafter, a shape of the common electrode 270 will be described with reference to FIG. 1.

The common electrode 270, having a planar shape, may be provided as a whole plate over an entire surface of the second substrate 210. The common electrode 270 corresponding to a single pixel has a substantially quadrangular shape, and includes an aperture having a cross shape. The common electrode 270 corresponding to a single pixel may be divided into four sub-areas by the aperture.

In addition, the common electrode 270 may have a central aperture at a central portion of the aperture in each of the first, second, and third pixel electrodes 191r, 191g, and 191b. The central aperture may have a polygonal shape, e.g., a lozenge shape, including four linear sides respectively positioned at the four sub-areas of the common electrode 270. The common electrode 270 will be described further in detail in second, third, ninth, and tenth exemplary embodiments, which include modified common electrodes 270.

Hereinafter, a LCD device according to a second exemplary embodiment will be described with reference to FIGS. 4, 5, and 6. The same configurations as those of the first exemplary embodiment described hereinabove will be represented by the same reference numeral, and repeated descriptions will be omitted.

Apertures, e.g., an aperture 74r, of a common electrode 270 respectively corresponding to first, second, and third pixel electrodes 191r, 191g, and 191b have the same shape as one another. Accordingly, for ease of description, the aperture 74r of the common electrode 270 corresponding to the first pixel electrode 191r will be described in comparison with an aperture 74w of the common electrode 270 corresponding to a fourth pixel electrode 191w.

Figure 4:
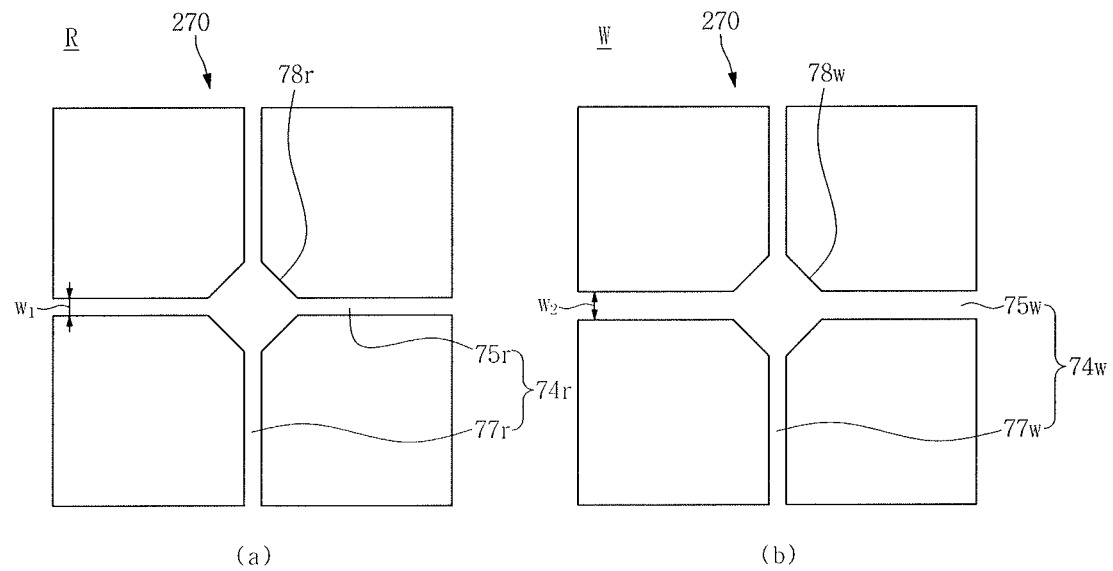
FIGS. 4, 5, and 6 illustrate schematic plan views of apertures of a common electrode respectively corresponding to a first pixel electrode and a fourth pixel electrode according to a second exemplary embodiment.
Figure 5:
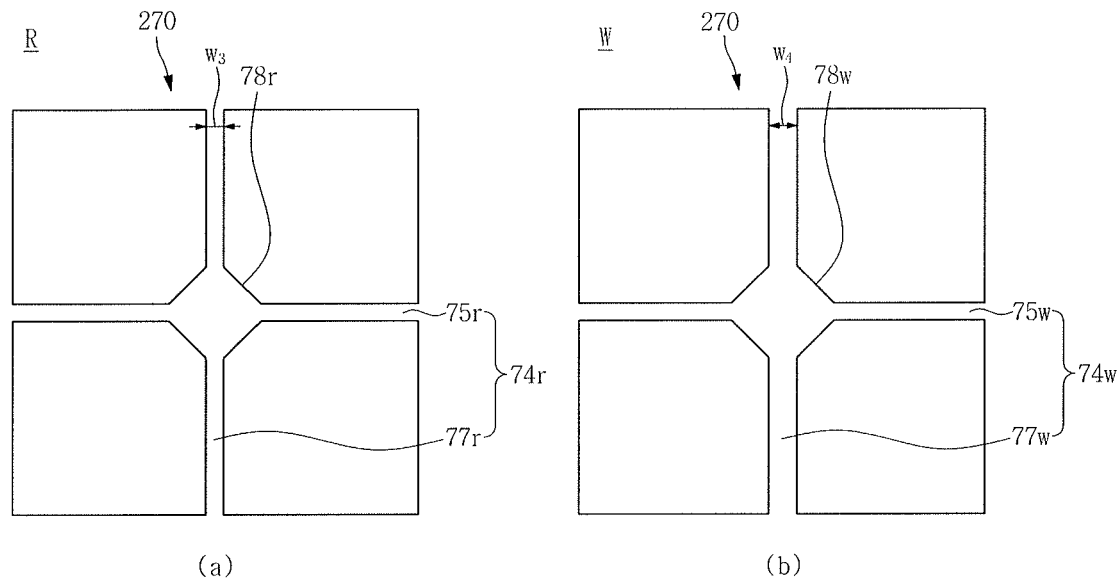
Figure 6:
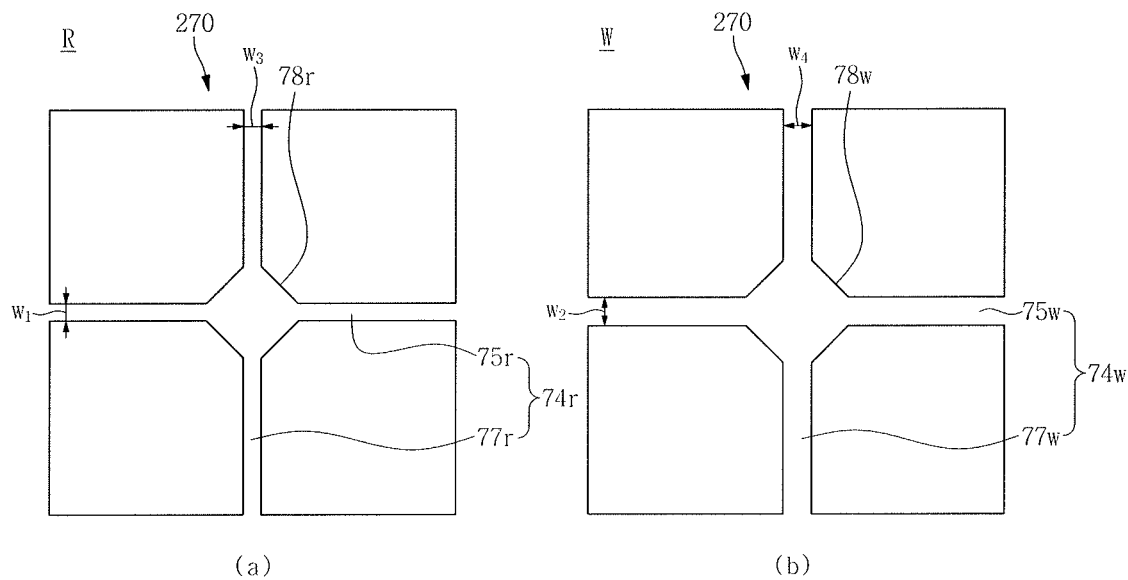

FIGS. 4, 5, and 6 illustrate schematic plan views of the apertures 74r and 74w of the common electrode 270 respectively corresponding to the first pixel electrode 191r and the fourth pixel electrode 191w according to the second exemplary embodiment.

With reference to FIGS. 4, 5, and 6, according to the second exemplary embodiment, each respective planar area of the common electrode 270 corresponding to the first, second, and third pixel electrodes 191r, 191g, and 191b (refer to FIG. 1), i.e., a planar area of the common electrode 270 excluding the apertures, e.g., excluding the aperture 74r, may be larger than that of the common electrode 270 corresponding to the fourth pixel electrode 191w.

In detail, the common electrode 270, having a planar shape, may be provided as a whole plate on an entire surface of a second substrate 210. The common electrode 270 corresponding to a single pixel may have a substantially, e.g., quadrangular, shape, and includes the apertures 74r and 74w, each having a cross shape, which include first apertures 75r and 75w and second apertures 77r and 77w, respectively. The common electrode 270 corresponding to a single pixel may be divided into four sub-areas by the apertures 74r and 74w. In an exemplary embodiment, the common electrode 270 may include central apertures 78r and 78w defined at central portions of the apertures 74r and 74w, respectively. The central apertures 78r and 78w may each have a polygonal shape, e.g., a lozenge shape, including four linear sides respectively positioned at the four sub-areas of the common electrode 270. Vertices of the central apertures 78r and 78w may be positioned on the apertures 74r and 74w of the common electrode 270, respectively.

In an exemplary embodiment, a planar area of the common electrode 270 corresponding to a red pixel R is larger than a planar area of the common electrode 270 corresponding to a white pixel W. For example, as illustrated in FIG. 4, a width w2 of the first aperture 75w of the common electrode 270 overlapping the white pixel W is wider than a width w1 of the first aperture 75r of the common electrode 270 overlapping the red pixel R. Accordingly, a planar area of the common electrode 270 corresponding to the white pixel W is reduced (due to the wider aperture), thus resulting in a decrease in intensity of a fringe field in the white pixel W. As the fringe field has a reduced intensity, an effective refractive index decreases and the side visibility is improved in the white pixel W.

In an alternative exemplary embodiment, as illustrated in FIG. 5, a width w4 of the second aperture 77w of the common electrode 270 overlapping the white pixel W may be wider than a width w3 of the second aperture 77r of the common electrode 270 overlapping the red pixel R. In another alternative exemplary embodiment, as illustrated in FIG. 6, the width w2 of the first aperture 75w of the common electrode 270 overlapping the white pixel W and the width w4 of the second aperture 77w thereof may be wider than the width w1 of the first aperture 75r of the common electrode 270 overlapping the red pixel R and the width w3 of the second aperture 77r thereof.

According to the second exemplary embodiment, the first, second, third, and fourth pixel electrodes 191r, 191g, 191b, and 191w (refer to FIG. 1) may each have the same shape as the shape of the first pixel electrode 191r illustrated in FIG. 3. That is, the fourth pixel electrode 191w, dissimilar with respect to that of the first exemplary embodiment, may have the same shape as shapes of the first, second, and third pixel electrodes 191r, 191g, and 191b.

In an exemplary embodiment, the stem portions 194r and 194w of the pixel electrode 191 (refer to FIG. 1) and the apertures 74r and 74w of the common electrode 270 may be arranged to oppose, e.g., overlap, one another, respectively, and the four sub-areas of the pixel electrode 191 oppose the four sub-areas of the common electrode 270, respectively. The apertures 74r and 74w of the common electrode 270 may extend parallel to the stem portions 194r and 194w of the pixel electrode 191.

Hereinafter, a LCD device according to a third exemplary embodiment will be described with reference to FIGS. 7, 8, 9, 10, 11, and 12. The same configurations as those of the first exemplary embodiment and the second exemplary embodiment described hereinabove will be represented by the same reference numeral, and the same description will be omitted.

Figure 7:
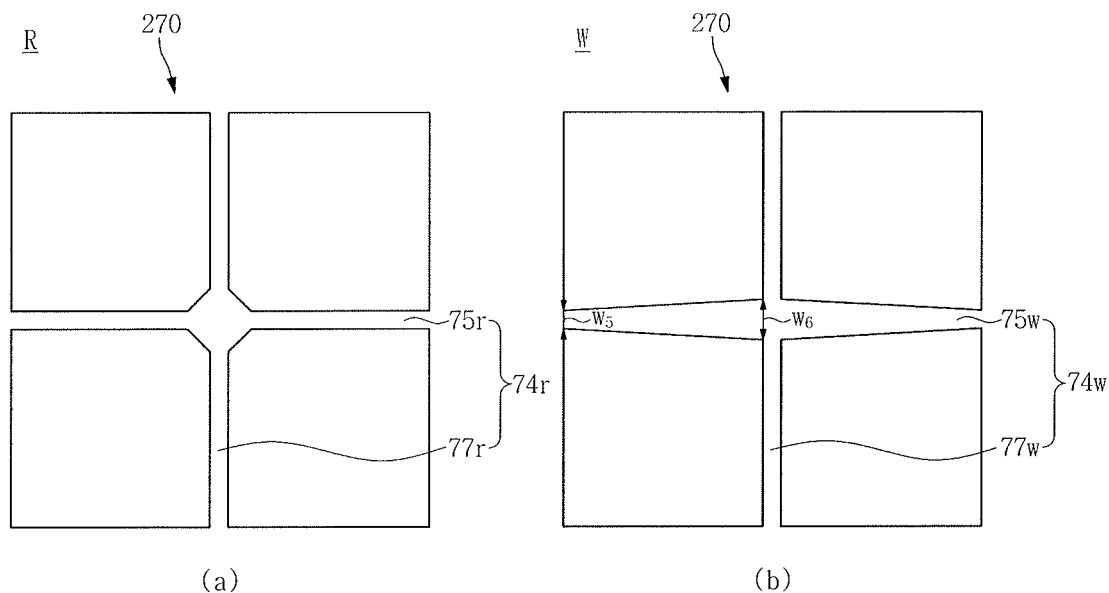
FIGS. 7 and 8 illustrate schematic plan views of apertures of a common electrode respectively corresponding to a first pixel electrode and a fourth pixel electrode according to a third exemplary embodiment.
Figure 8:
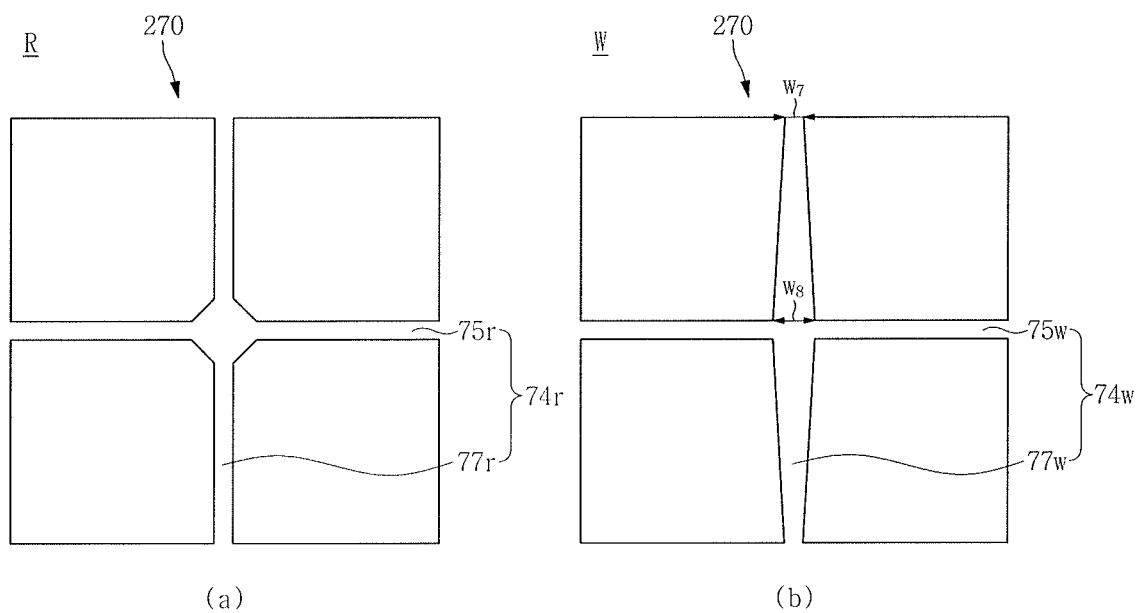
Figure 9:
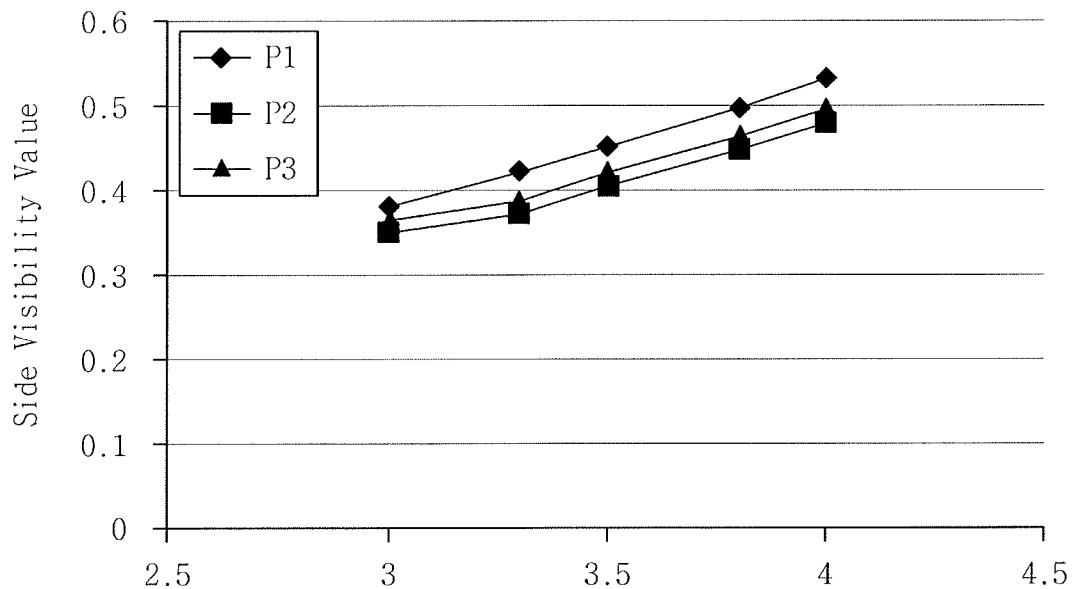
FIG. 9 illustrates a graph showing a relationship between a side-visibility index and a cell gap according to the third exemplary embodiment.
Figure 10:
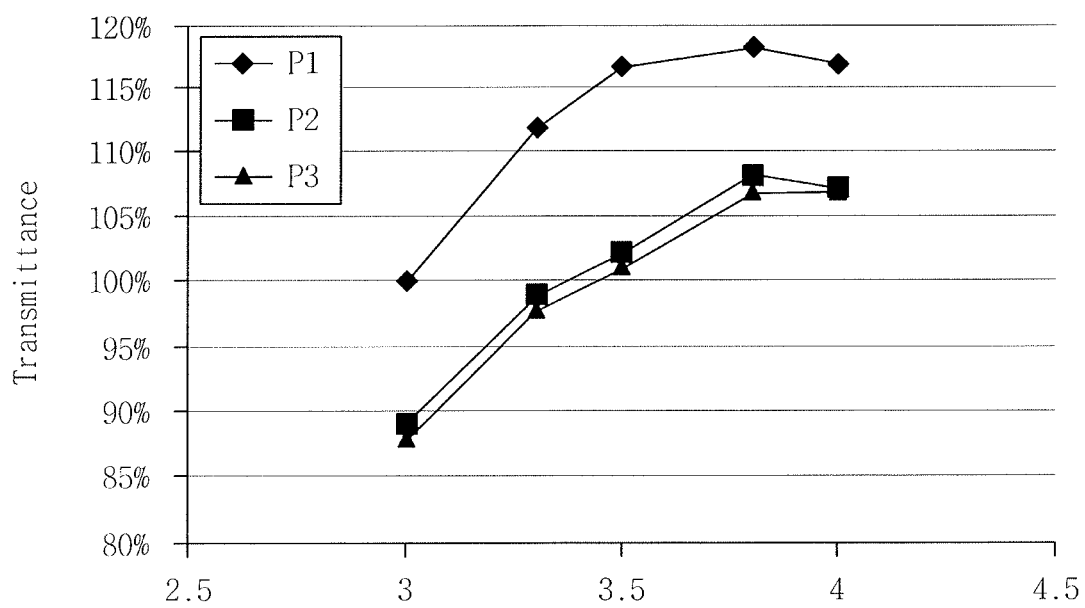
FIG. 10 illustrates a graph showing a relationship between a transmittance and the cell gap according to the third exemplary embodiment.
Figure 11:
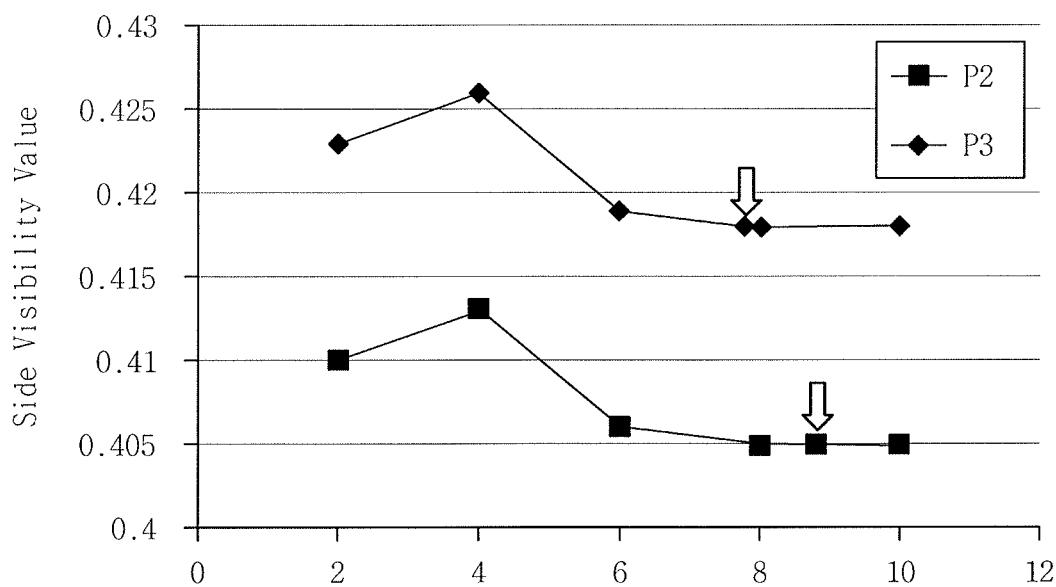
FIG. 11 illustrates a graph showing a relationship between the side-visibility index and a width of the aperture of the common electrode according to the third exemplary embodiment.
Figure 12:
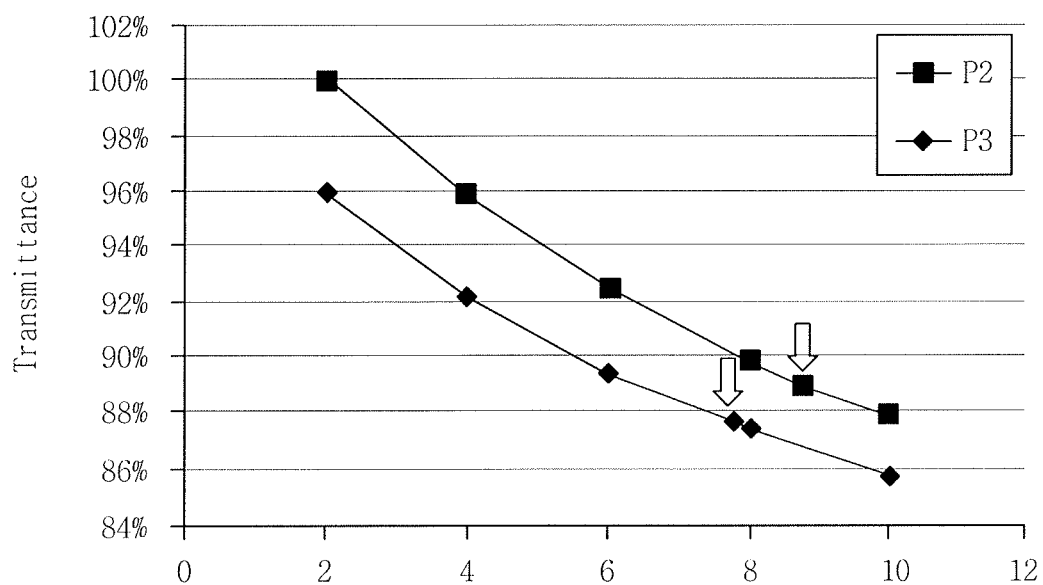
FIG. 12 illustrates a graph showing a relationship between the transmittance and the width of the aperture of the common electrode according to the third exemplary embodiment.

FIGS. 7 and 8 illustrate schematic plan views of apertures 74r and 74w of a common electrode 270 respectively corresponding to a first pixel electrode 191r and a fourth pixel electrode 191w according to a third exemplary embodiment. FIG. 9 illustrates a graph showing a relationship between a side-visibility index and a cell gap according to the third exemplary embodiment. FIG. 10 illustrates a graph showing a relationship between a transmittance and the cell gap according to the third exemplary embodiment. FIG. 11 illustrates a graph showing a relationship between the side-visibility index and a width of the aperture of the common electrode 270 according to the third exemplary embodiment. FIG. 12 illustrates a graph showing a relationship between the transmittance and the width of the aperture of the common electrode 270 according to the third exemplary embodiment.

Referring to FIGS. 7 and 8, according to the third exemplary embodiment, a planar area of the aperture 74w of the common electrode 270 corresponding to the fourth pixel electrode 191w is larger than each respective planar area of the apertures, e.g., the aperture 74r, of the common electrode 270 corresponding to first, second, and third pixel electrodes 191r, 191g, and 191b (refer to FIG. 1).

In an exemplary embodiment, a planar area of the aperture 74w of the common electrode 270 corresponding to a white pixel W is larger than that of the aperture 74r of the common electrode 270 corresponding to a red pixel R. For example, as illustrated in FIG. 7, a width of a first aperture 75w of the common electrode 270 corresponding to the white pixel W increases toward the center of the aperture 74w. Dissimilarly thereto, in an alternative exemplary embodiment, as illustrated in FIG. 8, a width of a second aperture 77w of the common electrode 270 corresponding to the white pixel W increases toward the center of the aperture 74w. Accordingly, a planar area of the common electrode 270 corresponding to the white pixel W is reduced, thus resulting in a decrease in intensity of a fringe field in the white pixel W. As the fringe field has a reduced intensity, an effective refractive index decreases and the side visibility is improved in the white pixel W.

According to the third exemplary embodiment, each of the first, second, third, and fourth pixel electrodes 191r, 191g, 191b, and 191w (refer to FIG. 1) may have the same shape as the shape of the fourth pixel electrode 191w illustrated in FIG. 3. That is. the fourth pixel electrode 191w, dissimilar to that of the first exemplary embodiment, may have the same shape as shapes of the first, second, and third pixel electrodes 191r, 191g, and 191b.

In an exemplary embodiment, the stem portions 194r and 194w of a pixel electrode 191 (refer to FIG. 1) and the apertures 74r and 74w of the common electrode 270 may be arranged to oppose one another, respectively, and four sub-areas of the pixel electrode 191 oppose four sub-areas of the common electrode 270, respectively. The apertures 74r and 74w of the common electrode 270 may extend parallel to the stem portions 194r and 194w of the pixel electrode 191.

Hereinafter, effects of the LCD device according to the third exemplary embodiment will be described in detail with reference to FIGS. 9, 10, 11, and 12.

FIG. 9 illustrates a graph of a side-visibility index, in which an x-axis denotes a cell gap, and a y-axis denotes the side-visibility index. The side-visibility index refers to a distortion degree of an image when a screen is viewed from the lateral side, as compared to a screen viewed from the front. In this regard, as the side-visibility index approaches 0, a difference in image quality between cases when viewed from the lateral side and when viewed from the front is small. In the graph illustrated in FIG. 9, a curve P1 denotes a side-visibility index of the red pixel R of FIG. 7, and curves P2 and P3 denote side-visibility indexes of the white pixel W of FIG. 7. Hereinafter, for ease of description, the curve P1, the curve P2, and the curve P3 will be referred to as a first curve, a second curve, and a third curve, respectively.

The first curve P1 denotes the side-visibility index of the red pixel R, and the red pixel R may have a cell gap of about 3 μm, for example. The second curve P2 and the third curve P3 denote side-visibility indexes of the white pixel W, and the white pixel W may have a cell gap of about 3.5 μm, for example, due to the step difference.

As described in the first exemplary embodiment, the side visibility may be degraded due to the step difference generated in the white pixel W. Accordingly, it is necessary to enhance the side visibility of the white pixel W to a level similar to that of the side visibility of the red, green, or blue pixel R, G, or B. As described hereinabove, the cell gap of the red pixel R is about 3 μm, and the cell gap of the white pixel W is about 3.5 μm. Thus, the common electrode 270 of the white pixel W may be modified to have a side-visibility index equivalent to a side-visibility index of the red pixel R when the cell gap of the red pixel R is about 3 μm.

Referring to the graph illustrated in FIG. 9, based on the above description, it is verified that the side-visibility indexes of the second and third curves P2 and P3 corresponding to about 3.5 μm are close to the side-visibility index of the first curve P1 corresponding to about 3 μm. Accordingly, it is verified that the side visibility may be improved when employing the common electrode 270 according to the third exemplary embodiment.

FIG. 10 illustrates a graph of transmittances of the red pixel R and the white pixel W, in which an x-axis denotes a cell gap, and a y-axis denotes a transmittance. The first curve P1 denotes a transmittance of the red pixel R, and the second and third curves P2 and P3 denote transmittances of the white pixel W. When comparing the first, second, and third curves P1, P2, and P3 of the graph illustrated in FIG. 10, it is verified that a transmittance of the white pixel W having a cell gap of about 3.5 μm is substantially equivalent to a transmittance of the red pixel R having a cell gap of 3 μm. Accordingly, the LCD device according to the third exemplary embodiment may have a transmittance substantially equivalent to that of a conventional display device.

FIG. 11 illustrates a graph of a side-visibility index of the white pixel W, in which a y-axis denotes a side-visibility index, and an x-axis denotes a maximum increase of a width of the first aperture 75*w*. As used herein, the maximum increase of the width of the first aperture 75*w* is obtained by subtracting a width w5 of the first aperture 75*w* that is smallest from a width w6 thereof that is largest.

For ease of description, the width w5 of the first aperture 75*w* that is most apart from the center of the aperture 74*w* is referred to as "first width," and the width w6 of the first aperture 75*w* that is closest to the center of the aperture 74*w* is referred to as "second width." Accordingly, the maximum increase described above is equal to "second width−first width."

With reference to FIG. 11, it is verified that each of the second curve P2 and the third curve P3 has its lowest value when the maximum increase of the width of the first aperture 75*w* is about 8 μm.

Accordingly, in the case that the first width w5 of the first aperture 75*w* corresponding to the second curve P2 is about 4.4 μm, the second width w6 thereof may be about 13.22 μm. In an exemplary embodiment, the width of the first aperture 75*w* corresponding to the second curve P2 may increase from about 3.9 μm to about 13.5 μm. For example, the first width w5 of the first aperture 75*w* corresponding to the second curve P2 may be in a range of about 3.9 μm to about 4.9 μm, and the second width w6 thereof may be in a range of about 12.5 μm to about 13.5 μm.

In addition, in the case that the first width w5 of the first aperture 75*w* corresponding to the third curve P3 is about 5.4 μm, the second width w6 thereof may be about 13.22 μm. In an exemplary embodiment, the width of the first aperture 75*w* corresponding to the third curve P3 may increase from about 4.9 μm to about 13.5 μm. For example, the first width w5 of the first aperture 75*w* corresponding to the third curve P3 may be in a range of about 4.9 μm to about 5.9 μm, and the second width w6 thereof may be in a range of about 12.5 μm to about 13.5 μm.

FIG. 12 illustrates a graph of a transmittance, in which a y-axis denotes the transmittance, and an x-axis denotes a maximum increase of a width of the first aperture 75*w*. As used herein, the maximum increase of the width of the first aperture 75*w* is obtained by subtracting a width w5 of the first aperture 75*w* that is smallest from a width w6 thereof that is largest.

Referring to FIG. 12, transmittances of the second and third curves P2 and P3 each are about 90%, when the maximum increase described above is about 8 μm. Accordingly, even though the aperture 74*w* of the common electrode 270 is modified according to the third exemplary embodiment, a transmittance having the same level as that of a conventional display device may be achieved.

Hereinafter, an LCD device according to a fourth exemplary embodiment will be described with reference to FIG. 13. The same configurations as those of the first exemplary embodiment described hereinabove will be represented by the same reference numeral, and repeated descriptions will be omitted.

Figure 13:
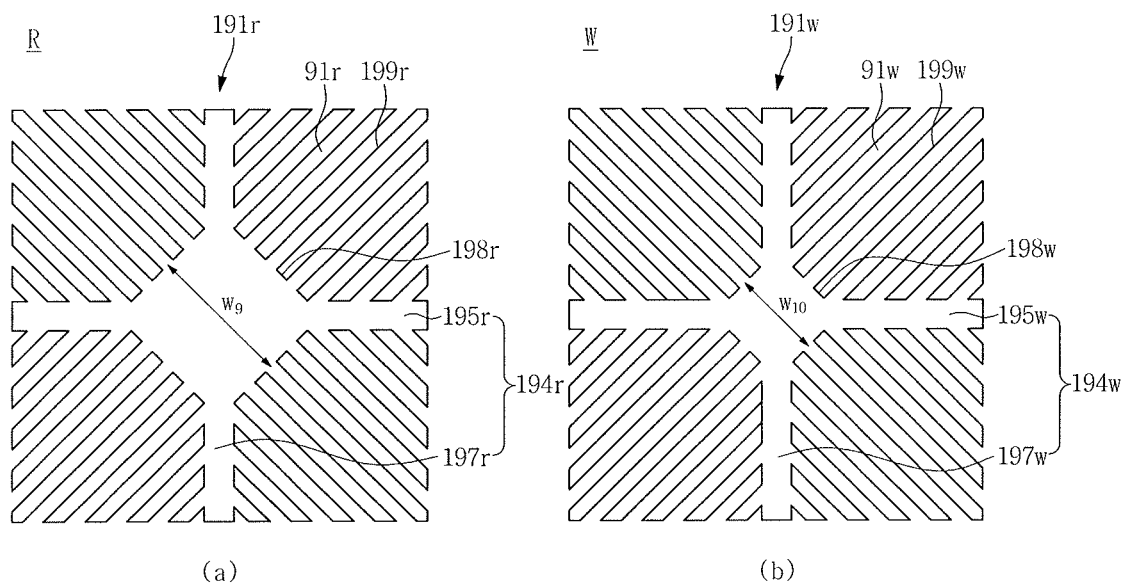
FIG. 13 illustrates schematic plan views of a first pixel electrode and a fourth pixel electrode according to a fourth exemplary embodiment.

FIG. 13 illustrates schematic plan views of a first pixel electrode 191*r* and a fourth pixel electrode 191*w* according to the fourth exemplary embodiment.

Similarly to the first exemplary embodiment, first, second, and third pixel electrodes 191*r*, 191*g*, and 191*b* are disposed in a red pixel R, a green pixel G, and a blue pixel B, respectively, and the fourth pixel electrode 191*w* is disposed in a white pixel W. Structures of respective ones of the first, second, and third pixel electrodes 191*r*, 191*g*, and 191*b* are the same as one another and different from a structure of the fourth pixel electrode 191*w*. Accordingly, the first pixel electrode 191*r* will be described in comparison with the fourth pixel electrode 191*w*, for ease of description.

Referring to FIG. 13, the first pixel electrode 191*r* and the fourth pixel electrode 191*w* according to the fourth exemplary embodiment include stem portions 194*r* and 194*w* and branch portions 199*r* and 199*w*, respectively, which define a plurality of domains. According to the fourth exemplary embodiment, the fourth pixel electrode 191*w* includes a central pattern 198*w*, which is dissimilar to the first exemplary embodiment.

For example, the fourth pixel electrode 191*w* further includes the central pattern 198*w* which is an electrode at a central portion of the stem portion 194*w*. The central pattern 198*w* may have a polygonal shape, e.g., a lozenge shape, including four linear sides respectively positioned at four sub-areas of the fourth pixel electrode 191*w*. Vertices of the central pattern 198*w* may be positioned on the stem portion 194*w* of the fourth pixel electrode 191*w*. In the case that the fourth pixel electrode 191*w* includes the central pattern 198*w*, the capability of controlling liquid crystals is improved by virtue of a fringe field which is generated by edge sides of the central pattern 198*w*, and thereby transmittance of the LCD device may further be improved.

In addition, the central pattern 198w of the fourth pixel electrode 191w has a planar area less than that of the central pattern 198r of the first pixel electrode 191r. As illustrated in FIG. 13, a width w10 of the central pattern 198w of the fourth pixel electrode 191w is less than a width w9 of the central pattern 198r of the first pixel electrode 191r.

As such, as the central pattern 198w of the fourth pixel electrode 191w has the planar area less than the planar area of the central pattern 198r of the first pixel electrode 191r, the fourth pixel electrode 191w has an overall planar area less than that of one of the first, second, and third pixel electrodes 191r, 191g, and 191b. Accordingly, an intensity of the fringe field between the fourth pixel electrode 191w and a common electrode 270 is reduced, as described hereinabove with regard to the first exemplary embodiment. As the fringe field has a reduced intensity, an effective refractive index of the white pixel 191w decreases. Further, in accordance with the decrease of the effective refractive index which affects side visibility, the side visibility of the white pixel W may be improved.

Although not illustrated, the common electrode 270 according to the fourth exemplary embodiment may have the same shape as that of the common electrode 270 corresponding to the first pixel electrode 191r according to the first exemplary embodiment. However, a planar area of a central aperture of the common electrode 270 corresponding to the fourth pixel electrode 191w may be less than that corresponding to the first pixel electrode 191r.

Hereinafter, an LCD device according to a fifth exemplary embodiment will be described with reference to FIGS. 14 and 15. The same configurations as those of the first exemplary embodiment described hereinabove will be represented by the same reference numeral, and repeated descriptions will be omitted.

Figure 14:
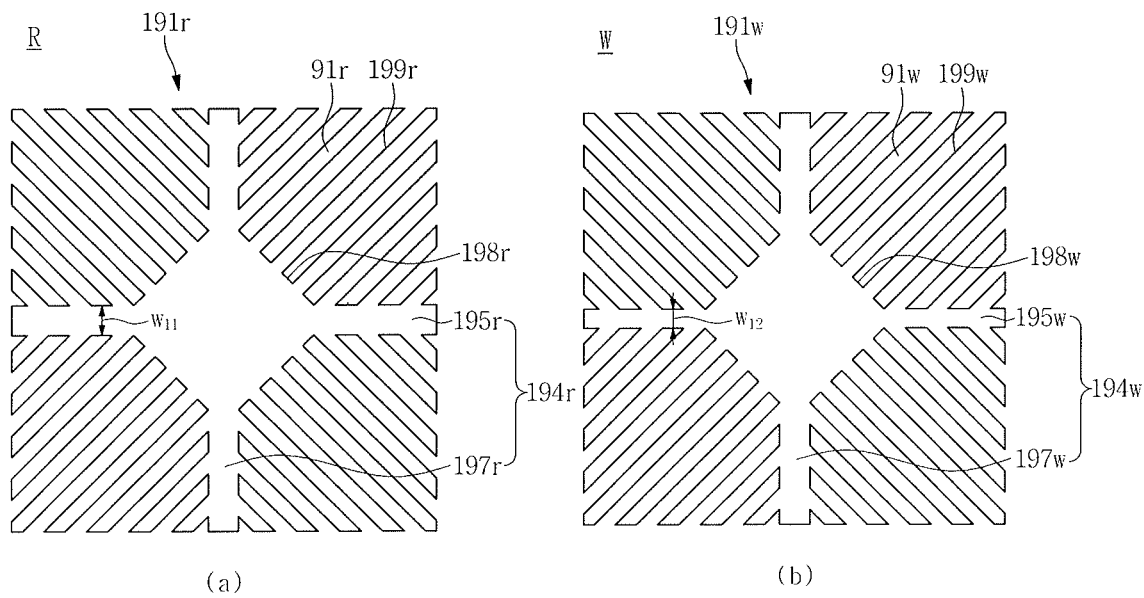
FIGS. 14 and 15 illustrate schematic plan views of a first pixel electrode and a fourth pixel electrode according to a fifth exemplary embodiment.
Figure 15:
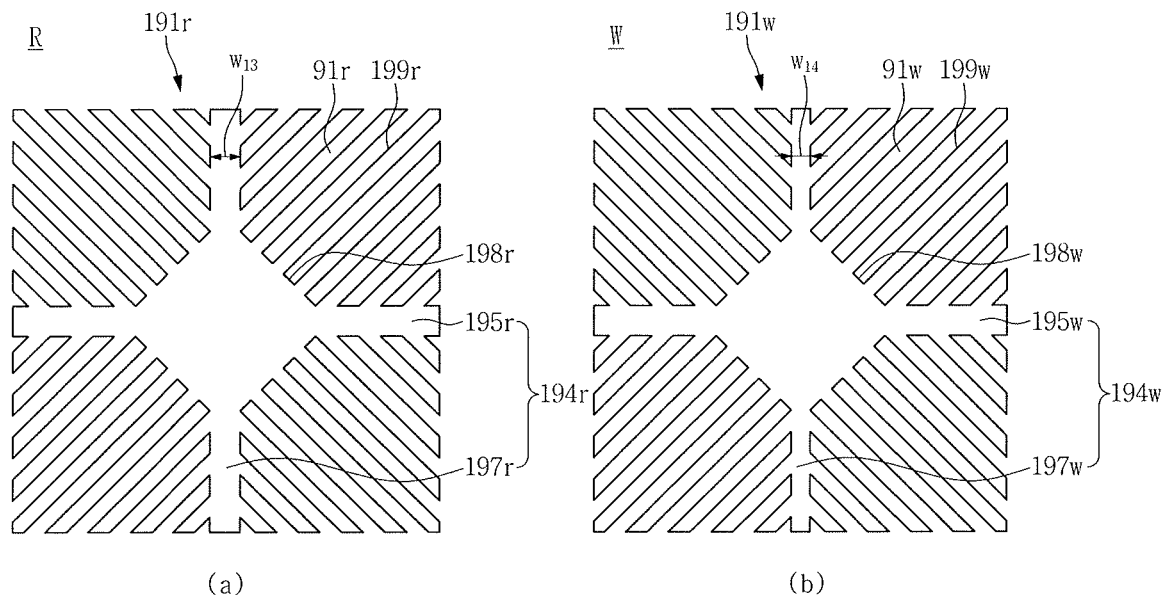

FIGS. 14 and 15 illustrate schematic plan views of a first pixel electrode 191r and a fourth pixel electrode 191w according to the fifth exemplary embodiment.

First, second, and third pixel electrodes 191r, 191g, and 191b are disposed in a red pixel R, a green pixel G, and a blue pixel B, respectively, and the fourth pixel electrode 191w is disposed in a white pixel W. Structures of respective ones of the first, second, and third pixel electrodes 191r, 191g, and 191b are the same as one another and different from a structure of the fourth pixel electrode 191w. Accordingly, the first pixel electrode 191r will be described in comparison with the fourth pixel electrode 191w, for ease of description.

Referring to FIGS. 14 and 15, the first pixel electrode 191r and the fourth pixel electrode 191w according to the fifth exemplary embodiment include stem portions 194r and 194w, branch portions 199r and 199w, and central patterns 198r and 198w, respectively, which define a plurality of domains.

The fourth pixel electrode 191w according to the fifth exemplary embodiment, dissimilar to that of the first exemplary embodiment, includes the central pattern 198w that has the same planar area as that of the first pixel electrode 191r. In addition, the stem portion 194w and the branch portion 199w of the fourth pixel electrode 191w have an overall planar area less than that of the stem portion 194r and the branch portion 199r of one of the first, second, and third pixel electrodes 191r, 191g, and 191b.

In an exemplary embodiment, as illustrated in FIG. 14, a width w12 of a first stem portion 195w of the fourth pixel electrode 191w is less than a width w11 of a first stem portion 195r of the first pixel electrode 191r. That is, a planar area of the first stem portion 195w of the fourth pixel electrode 191w is less than that of the first stem portion 195r of the first pixel electrode 191r.

In an alternative exemplary embodiment, as illustrated in FIG. 15, a width w14 of a second stem portion 197w of the fourth pixel electrode 191w is less than a width w13 of a second stem portion 197r of the first pixel electrode 191r. That is, a planar area of the second stem portion 197w of the fourth pixel electrode 191w is less than that of the second stem portion 197r of the first pixel electrode 191r.

As such, as the stem portion 194w and the branch portion 199w of the fourth pixel electrode 191w are provided to have the overall planar area less than that of the stem portion 194r and the branch portion 199r of one of the first, second, and third pixel electrodes 191r, 191g, and 191b, a planar area of a fine slit 91w of the fourth pixel electrode 191w increases. Accordingly, an intensity of a fringe field between the fourth pixel electrode 191w and a common electrode 270 is reduced, as described above with regard to the first exemplary embodiment. As the fringe field has a reduced intensity, an effective refractive index of the white pixel 191w decreases. Further, in accordance with the decrease of the effective refractive index which affects side visibility, the side visibility of the white pixel W may be improved.

Although not illustrated, the common electrode 270 according to the fifth exemplary embodiment may have the same shape as that of the common electrode 270 corresponding to the first pixel electrode 191r according to the first exemplary embodiment. However, a planar area of a first aperture of the common electrode 270 corresponding to the fourth pixel electrode 191w may be less than that corresponding to the first pixel electrode 191r.

Hereinafter, an LCD device according to a sixth exemplary embodiment will be described with reference to FIGS. 16 and 17. The same configurations as those of the first exemplary embodiment described hereinabove will be represented by the same reference numeral, and repeated descriptions will be omitted.

Figure 16:
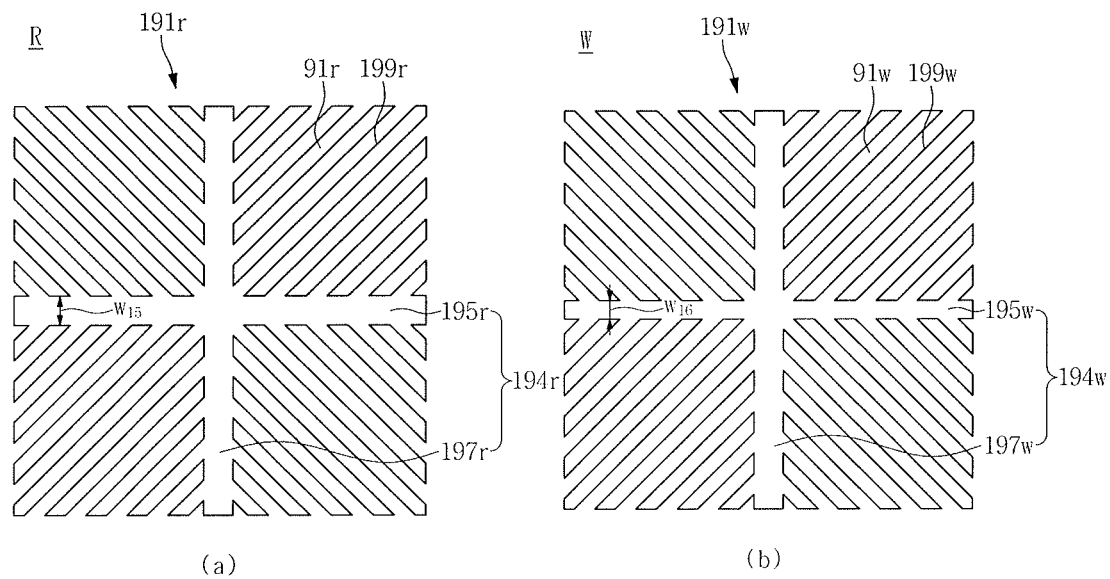
FIGS. 16 and 17 illustrate schematic plan views of a first pixel electrode and a fourth pixel electrode according to a sixth exemplary embodiment.
Figure 17:
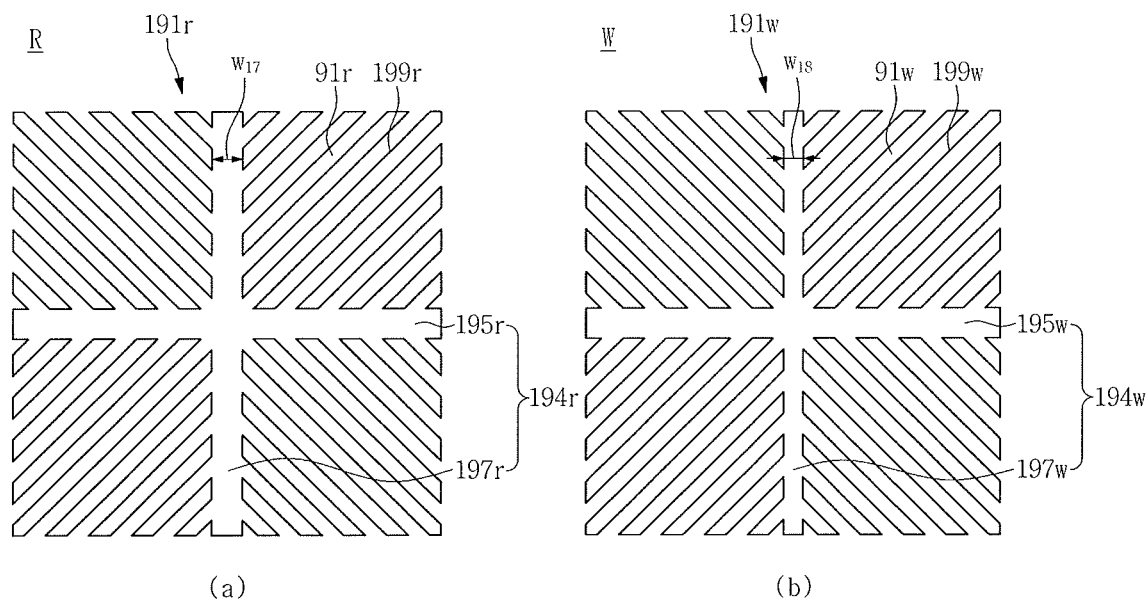

FIGS. 16 and 17 illustrate schematic plan views of a first pixel electrode 191r and a fourth pixel electrode 191w according to a sixth exemplary embodiment.

First, second, and third pixel electrodes 191r, 191g, and 191b are disposed in a red pixel R, a green pixel G, and a blue pixel B, respectively, and the fourth pixel electrode 191w is disposed in a white pixel W. Structures of respective ones of the first, second, and third pixel electrodes 191r, 191g, and 191b are the same as one another and different from a structure of the fourth pixel electrode 191w. Accordingly, the first pixel electrode 191r will be described in comparison with the fourth pixel electrode 191w, for ease of description.

Referring to FIGS. 14 and 15, the first pixel electrode 191r and the fourth pixel electrode 191w according to the sixth exemplary embodiment include stem portions 194r and 194w and branch portions 199r and 199w, respectively, which define a plurality of domains.

Each of the first pixel electrode 191r and the fourth pixel electrode 191w according to the sixth exemplary embodiment does not include a central pattern 198w, which is dissimilar to the first exemplary embodiment. In addition, the stem portion 194w and the branch portion 199w of the fourth pixel electrode 191w have an overall planar area less than that of the stem portion 194r and the branch portion 199r of one of the first, second, and third pixel electrodes 191r, 191g, and 191b.

In an exemplary embodiment, as illustrated in FIG. 16, a width w16 of a first stem portion 195w of the fourth pixel electrode 191w is less than a width w15 of a first stem portion 195r of the first pixel electrode 191r. That is, a planar area of the first stem portion 195w of the fourth pixel electrode 191w is less than that of the first stem portion 195r of the first pixel electrode 191r.

In an alternative exemplary embodiment, as illustrated in FIG. 17, a width w18 of a second stem portion 197w of the fourth pixel electrode 191w is less than a width w17 of a second stem portion 197r of the first pixel electrode 191r. That is, a planar area of the second stem portion 197w of the fourth pixel electrode 191w is less than that of the second stem portion 197r of the first pixel electrode 191r.

As such, as the stem portion 194w and the branch portion 199w of the fourth pixel electrode 191w are provided to have the overall planar area less than that of the stem portion 194r and the branch portion 199r of one of the first, second, and third pixel electrodes 191r, 191g, and 191b, an intensity of a fringe field between the fourth pixel electrode 191w and a common electrode 270 is reduced as described above with regard to the first exemplary embodiment. As the fringe field has a reduced intensity, an effective refractive index of the white pixel 191w decreases. Further, in accordance with the decrease of the effective refractive index which affects side visibility, the side visibility of the white pixel W may be improved.

Although not illustrated, the common electrode 270 according to the sixth exemplary embodiment may have the same shape as that of the common electrode 270 corresponding to the fourth pixel electrode 191w according to the first exemplary embodiment. However, a planar area of an aperture of the common electrode 270 corresponding to the fourth pixel electrode 191w may be less than that corresponding to the first pixel electrode 191r.

Hereinafter, an LCD device according to a seventh exemplary embodiment will be described with reference to FIGS. 18 and 19. The same configurations as those of the first exemplary embodiment described hereinabove will be represented by the same reference numeral, and repeated descriptions will be omitted.

Figure 18:
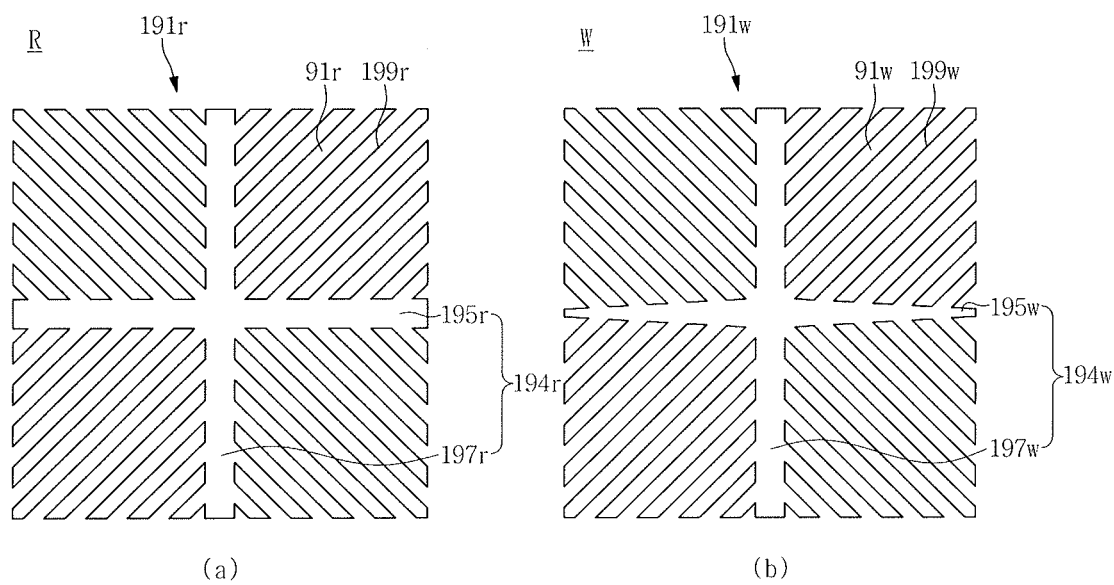
FIGS. 18 and 19 illustrate schematic plan views of a first pixel electrode and a fourth pixel electrode according to a seventh exemplary embodiment.
Figure 19:
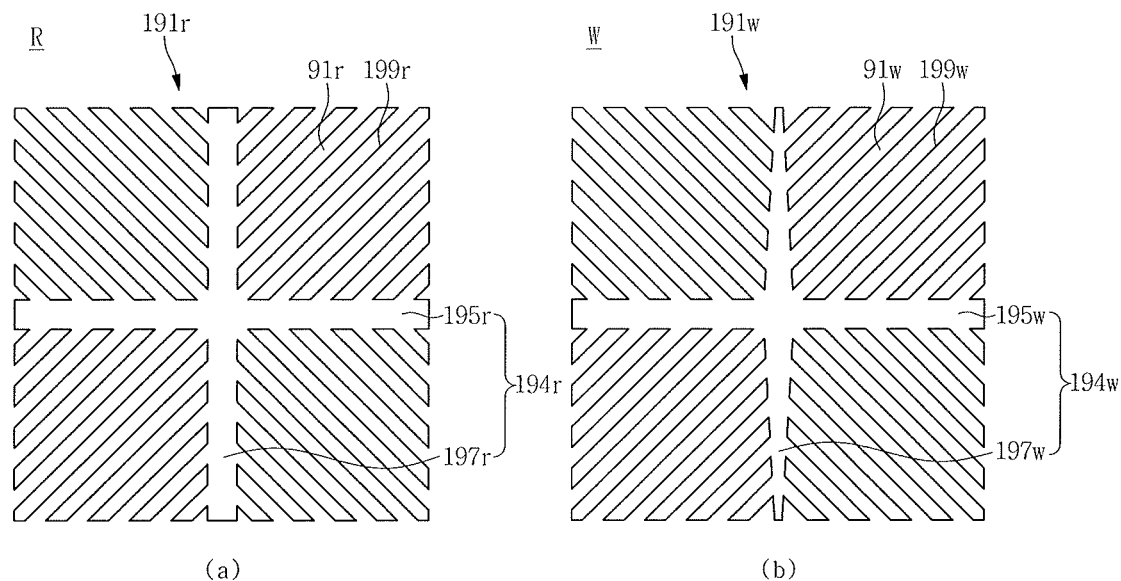

FIGS. 18 and 19 illustrate schematic plan views of a first pixel electrode 191r and a fourth pixel electrode 191w according to the seventh exemplary embodiment;

First, second, and third pixel electrodes 191r, 191g, and 191b are disposed in a red pixel R, a green pixel G, and a blue pixel B, respectively, and the fourth pixel electrode 191w is disposed in a white pixel W. Structures of respective ones of the first, second, and third pixel electrodes 191r, 191g, and 191b are the same as one another and different from a structure of the fourth pixel electrode 191w. Accordingly, the first pixel electrode 191r will be described in comparison with the fourth pixel electrode 191w, for ease of description.

Referring to FIGS. 18 and 19, the first pixel electrode 191r and the fourth pixel electrode 191w according to the seventh exemplary embodiment include stem portions 194r and 194w and branch portions 199r and 199w, respectively, which define a plurality of domains.

Each of the first pixel electrode 191r and the fourth pixel electrode 191w according to the seventh exemplary embodiment does not include a central pattern 198w, which is dissimilar to the first exemplary embodiment. In addition, the stem portion 194w and the branch portion 199w of the fourth pixel electrode 191w have an overall planar area less than that of the stem portion 194r and the branch portion 199r of one of the first, second, and third pixel electrodes 191r, 191g, and 191b.

In an exemplary embodiment, as illustrated in FIG. 18, a width of a first stem portion 195w of the fourth pixel electrode 191w increases toward the center of the stem portion 194w. In other words, a planar area of the first stem portion 195w of the fourth pixel electrode 191w is reduced toward an end portion of the stem portion 194w, as compared to a first stem portion 195r of the first pixel electrode 191r. That is, a planar area of the first stem portion 195w of the fourth pixel electrode 191w is less than that of the first stem portion 195r of the first pixel electrode 191r.

In an alternative exemplary embodiment, as illustrated in FIG. 19, a width of a second stem portion 197w of the fourth pixel electrode 191w increases toward the center of the stem portion 194w. In other words, a planar area of the second stem portion 197w of the fourth pixel electrode 191w is reduced toward an end portion of the stem portion 194w, as compared to a second stem portion 197r of the first pixel electrode 191r. That is, a planar area of the second stem portion 197w of the fourth pixel electrode 191w is less than that of the second stem portion 197r of the first pixel electrode 191r.

As such, as the stem portion 194w and the branch portion 199w of the fourth pixel electrode 191w are provided to have the overall planar area less than that of the stem portion 194r and the branch portion 199r of one of the first, second, and third pixel electrodes 191r, 191g, and 191b. an intensity of a fringe field between the fourth pixel electrode 191w and a common electrode 270 is reduced as described hereinabove with regard to the first exemplary embodiment. As the fringe field has a reduced intensity, an effective refractive index of the white pixel 191w decreases. Further, in accordance with the decrease of the effective refractive index which affects side visibility, the side visibility of the white pixel W may be improved.

Although not illustrated, the common electrode 270 according to the seventh exemplary embodiment may have the same shape as that of the common electrode 270 corresponding to the fourth pixel electrode 191w according to the first exemplary embodiment. However, a planar area of an aperture of the common electrode 270 corresponding to the fourth pixel electrode 191w may be less than that corresponding to the first pixel electrode 191r.

Hereinafter, an LCD device according to an eighth exemplary embodiment will be described with reference to FIG. 20. The same configurations as those of the first exemplary embodiment described hereinabove will be represented by the same reference numeral, and repeated descriptions will be omitted.

Figure 20:
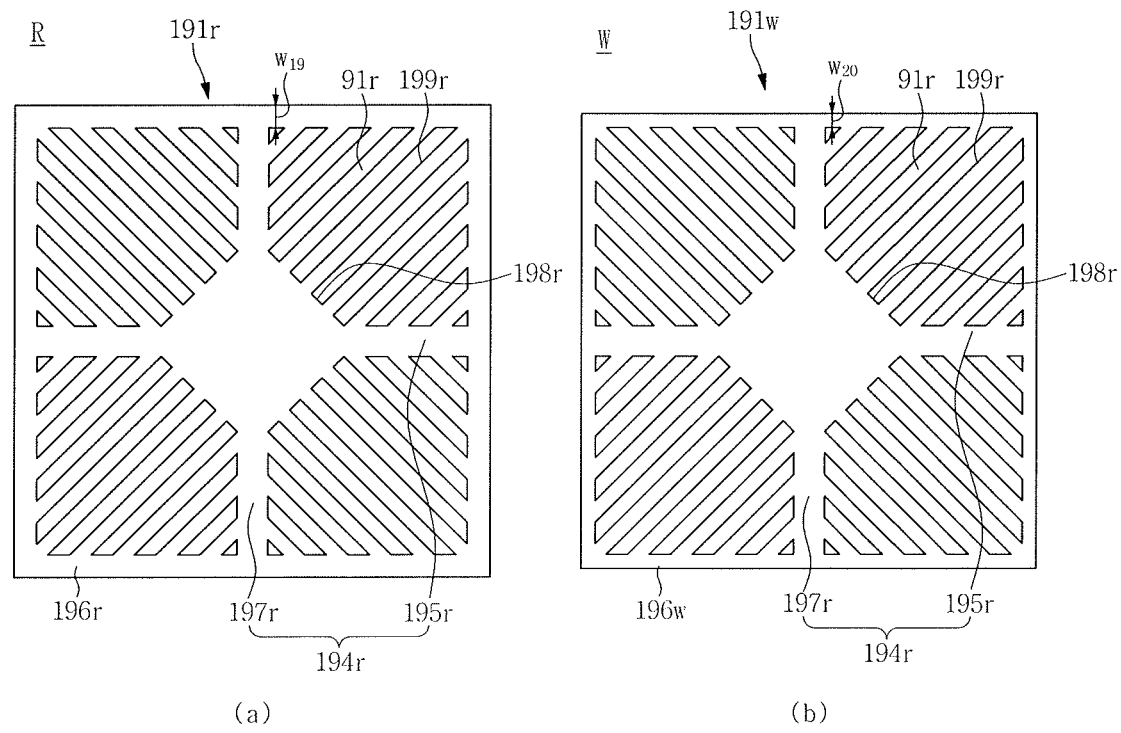
FIG. 20 illustrates schematic plan views of a first pixel electrode and a fourth pixel electrode according to an eighth exemplary embodiment.

FIG. 20 illustrates schematic plan views of a first pixel electrode 191r and a fourth pixel electrode 191w according to the eighth exemplary embodiment.

First, second, and third pixel electrodes 191r, 191g, and 191b are disposed in a red pixel R, a green pixel G, and a blue pixel B, respectively, and the fourth pixel electrode 191w is disposed in a white pixel W, which is similar to the first exemplary embodiment. Structures of respective ones of the first, second, and third pixel electrodes 191r, 191g, and 191b are the same as one another and different from a structure of the fourth pixel electrode 191w. Accordingly, the first pixel electrode 191r will be described in comparison with the fourth pixel electrode 191w, for ease of description.

Referring to FIG. 20, the first pixel electrode 191r and the fourth pixel electrode 191w according to the eighth exemplary embodiment include stem portions 194r and 194w, branch portions 199r and 199w, and third stem portions 196r and 196w, respectively, which define a plurality of domains. In addition, the fourth pixel electrode 191w according to the eighth exemplary embodiment includes a central pattern 198w, which is dissimilar to the first exemplary embodiment.

For example, the fourth pixel electrode 191w further includes the central pattern 198w which is an electrode at a central portion of the stem portion 194w. The central pattern 198w may have a polygonal shape, e.g., a lozenge shape, including four linear sides respectively positioned at four sub-areas of the fourth pixel electrode 191w. Vertices of the central pattern 198w may be positioned on the stem portion 194r of the fourth pixel electrode 191w. In the case that the fourth pixel electrode 191w includes the central pattern 198w, the capability of controlling liquid crystals is improved by virtue of a fringe field which is generated by edge sides of the central pattern 198w, and thereby transmittance of the LCD device may further be improved.

The stem portions 194r and 194w of the first pixel electrode 191r and the fourth pixel electrode 191w, dissimilar to those of the first exemplary embodiment, include third stem portions 196r and 196w, respectively. The third stem portions 196r and 196w connect end portions of first stem portions 195r and 195w and second stem portions 197r and 197w, respectively, thereby defining an exterior of the first, second, third, and fourth pixel electrodes 191r, 191g, 191b, and 191w.

In addition, the third stem portion 196w of the fourth pixel electrode 191w has a planar area less than that of the third stem portion 196r of the first pixel electrode 191r. As illustrated in FIG. 20, a width w20 of the third stem portion 196w of the fourth pixel electrode 191w is less than a width w19 of the third stem portion 196r of the first pixel electrode 191r.

As such, as the third stem portion 196w of the fourth pixel electrode 191w is provided to have the overall planar area less than that of the third stem portion 196r of the first pixel electrode 191r, the fourth pixel electrode 191w may have an overall planar area less than that of one of the first, second, and third pixel electrodes 191r, 191g, and 191b. Accordingly, an intensity of a fringe field between the fourth pixel electrode 191w and a common electrode 270 is reduced as described above with regard to the first exemplary embodiment. As the fringe field has a reduced intensity, an effective refractive index of the white pixel 191w decreases. Further, in accordance with the decrease of the effective refractive index which affects side visibility, the side visibility of the white pixel W may be improved.

Hereinafter, an LCD device according to a ninth exemplary embodiment will be described with reference to FIG. 21. The same configurations as those of the first exemplary embodiment described hereinabove will be represented by the same reference numeral, and repeated descriptions will be omitted.

Figure 21:
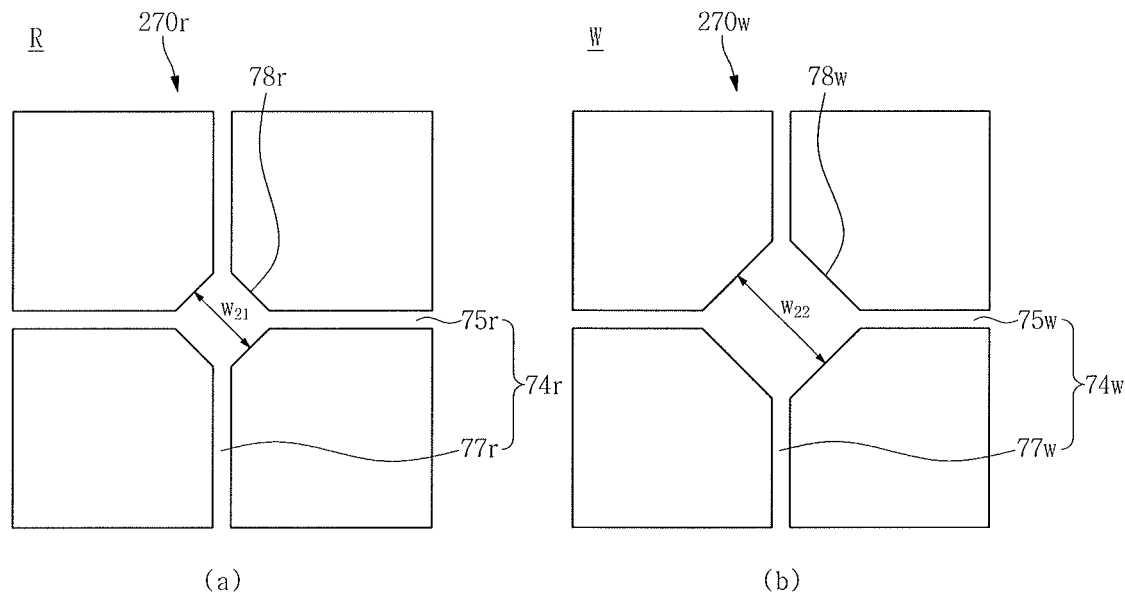
FIG. 21 illustrates schematic plan views of apertures of a common electrode respectively corresponding to a first pixel electrode and a fourth pixel electrode according to a ninth exemplary embodiment.

FIG. 21 illustrates schematic plan views of apertures 74r and 74w of a common electrode 270 respectively corresponding to a first pixel electrode 191r and a fourth pixel electrode 191w according to the ninth exemplary embodiment.

Apertures of the common electrode 270, e.g., an aperture 74r, respectively corresponding to first, second, and third pixel electrodes 191r, 191g, and 191b have the same shape as one another. Accordingly, for ease of description, the aperture 74r of the common electrode 270 corresponding to the first pixel electrode 191r will be described in comparison with the aperture 74w of the common electrode 270 corresponding to the fourth pixel electrode 191w.

Referring to FIG. 21, according to the ninth exemplary embodiment, a planar area of a central aperture 78w of the common electrode 270 corresponding to the white pixel electrode 191w (refer to FIG. 1) is larger than that of a central aperture 78r thereof corresponding to the first pixel electrode 191r (refer to FIG. 1).

In an exemplary embodiment, a planar area of the central aperture 78w of the common electrode 270 corresponding to a white pixel W is larger than that of the central aperture 78r of the common electrode 270 corresponding to a red pixel R. For example, as illustrated in FIG. 21, a width w22 of the central aperture 78w of the common electrode 270 overlapping the white pixel W is wider than a width w21 of the central aperture 78r of the common electrode 270 overlapping the red pixel R. Accordingly, a planar area of the common electrode 270 corresponding to the white pixel W is reduced, thus resulting in a decrease in intensity of a fringe field in the white pixel W. As the fringe field has a reduced intensity, an effective refractive index decreases and the side visibility is improved in the white pixel W.

Each of the first, second, third, and fourth pixel electrodes 191r, 191g, 191b, and 191w (refer to FIG. 1) according to the ninth exemplary embodiment may have the same shape as the shape of the first pixel electrode 191r illustrated in FIG. 3. That is, the fourth pixel electrode 191w, dissimilar to that of the first exemplary embodiment, may have the same shape as shapes of the first, second, and third pixel electrodes 191r, 191g, and 191b.

In an exemplary embodiment, stem portions 194r and 194w of the pixel electrode 191 (refer to FIG. 1) and the apertures 74r and 74w of the common electrode 270 may be arranged to oppose one another, respectively, and four sub-areas of the pixel electrode 191 oppose four sub-areas of the common electrode 270, respectively. The apertures 74r and 74w of the common electrode 270 may extend parallel to the stem portions 194r and 194w of the pixel electrode 191.

Hereinafter, an LCD device according to a tenth exemplary embodiment will be described with reference to FIGS. 22 and 23. The same configurations as those of the first exemplary embodiment described above will be represented by the same reference numeral, and repeated descriptions will be omitted.

Figure 22:
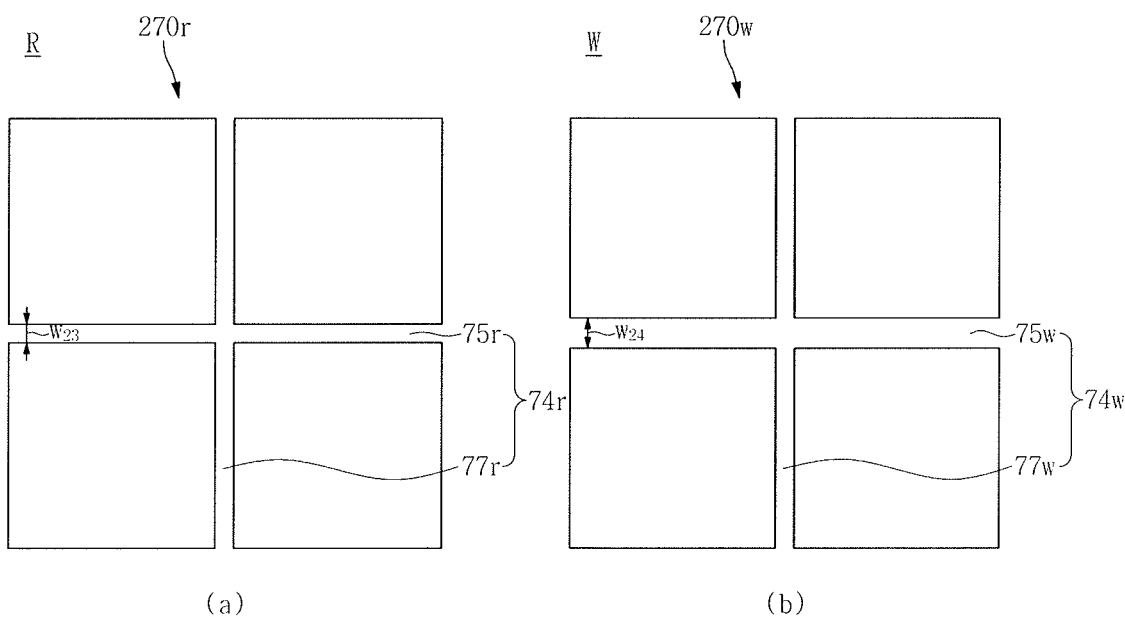
FIGS. 22 and 23 illustrate schematic plan views of apertures of a common electrode respectively corresponding to a first pixel electrode and a fourth pixel electrode according to a tenth exemplary embodiment.
Figure 23:
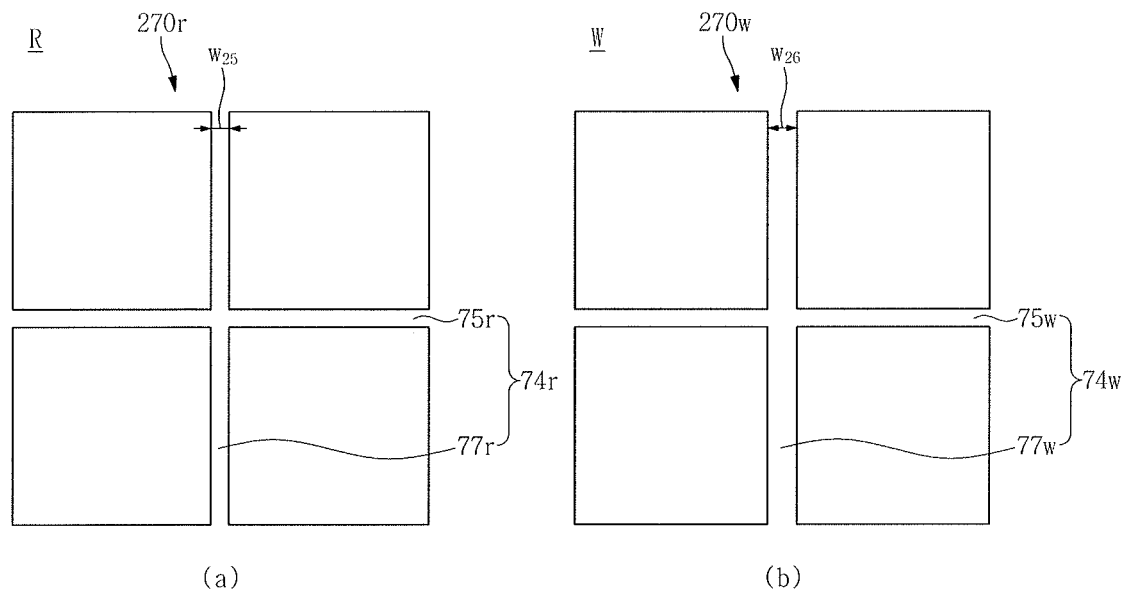

FIGS. 22 and 23 illustrate schematic plan views of apertures 74r and 74w of a common electrode 270 respectively corresponding to a first pixel electrode 191r and a fourth pixel electrode 191w according to the tenth exemplary embodiment.

Apertures of the common electrode 270, e.g., the aperture 74r, respectively corresponding to first, second, and third pixel electrodes 191r, 191g, and 191b have the same shape as one another. Accordingly, for ease of description, the aperture 74r of the common electrode 270 corresponding to the first pixel electrode 191r will be described in comparison with the aperture 74w of the common electrode 270 corresponding to the fourth pixel electrode 191w will be described.

Referring to FIGS. 22 and 23, according to the tenth exemplary embodiment, a planar area of the aperture 74w of the common electrode 270 corresponding to the fourth pixel electrode 191w is larger than each respective planar area of the apertures, e.g., the aperture 74r, of the common electrode 270 corresponding to the first, second, and third pixel electrodes 191r, 191g, and 191b (refer to FIG. 1). The common electrode 270 according to the tenth exemplary embodiment does not include central apertures 78r and 78w respectively defined at central portions of the apertures 74r and 74w.

In an exemplary embodiment, a planar area of the aperture 74w of the common electrode 270 corresponding to a white pixel W is larger than that of the aperture 74r of the common electrode 270 corresponding to a red pixel R. For example, as illustrated in FIG. 22. a width w24 of a first aperture 75w of the common electrode 270 overlapping the white pixel W is wider than a width w23 of a first aperture 75r of the common electrode 270 overlapping the red pixel R. Accordingly, a planar area of the common electrode 270 corresponding to the white pixel W is reduced, thus resulting in a decrease in intensity of a fringe field in the white pixel W. As the fringe field has a reduced intensity, an effective refractive index decreases and the side visibility is improved in the white pixel W.

In an alternative exemplary embodiment, as illustrated in FIG. 23, a width w26 of a second aperture 77w of the common electrode 270 overlapping the white pixel W may be wider than a width w25 of a second aperture 77r of the common electrode 270 overlapping the red pixel R.

In another alternative exemplary embodiment, although not illustrated, a width w24 of the first aperture 75w of the common electrode 270 overlapping the white pixel W and a width w26 of the second aperture 77w thereof may be wider than a width w23 of the first aperture 75r of the common electrode 270 overlapping the red pixel R and a width w25 of the second aperture 77r thereof.

According to the tenth exemplary embodiment, each of the first, second, third, and fourth pixel electrodes 191r, 191g, 191b, and 191w (refer to FIG. 1) may have the same shape as the shape of the fourth pixel electrode 191w illustrated in FIG. 3. That is, the fourth pixel electrode 191w, dissimilar to that of the first exemplary embodiment, may have the same shape as shapes of the first, second, and third pixel electrodes 191r, 191g, and 191b.

In an exemplary embodiment, stem portions 194r and 194w of the pixel electrode 191 (refer to FIG. 1) and the apertures 74r and 74w of the common electrode 270 may be arranged to oppose one another, respectively, and four sub-areas of the pixel electrode 191 oppose four sub-areas of the common electrode 270, respectively. The apertures 74r and 74w of the common electrode 270 may extend parallel to the stem portions 194r and 194w of the pixel electrode 191.

Hereinafter, referring to FIG. 24, an LCD device according to an eleventh exemplary embodiment will be described. The same configurations as those of the first exemplary embodiment described above will be represented by the same reference numeral, and repeated descriptions will be omitted.

Figure 24:
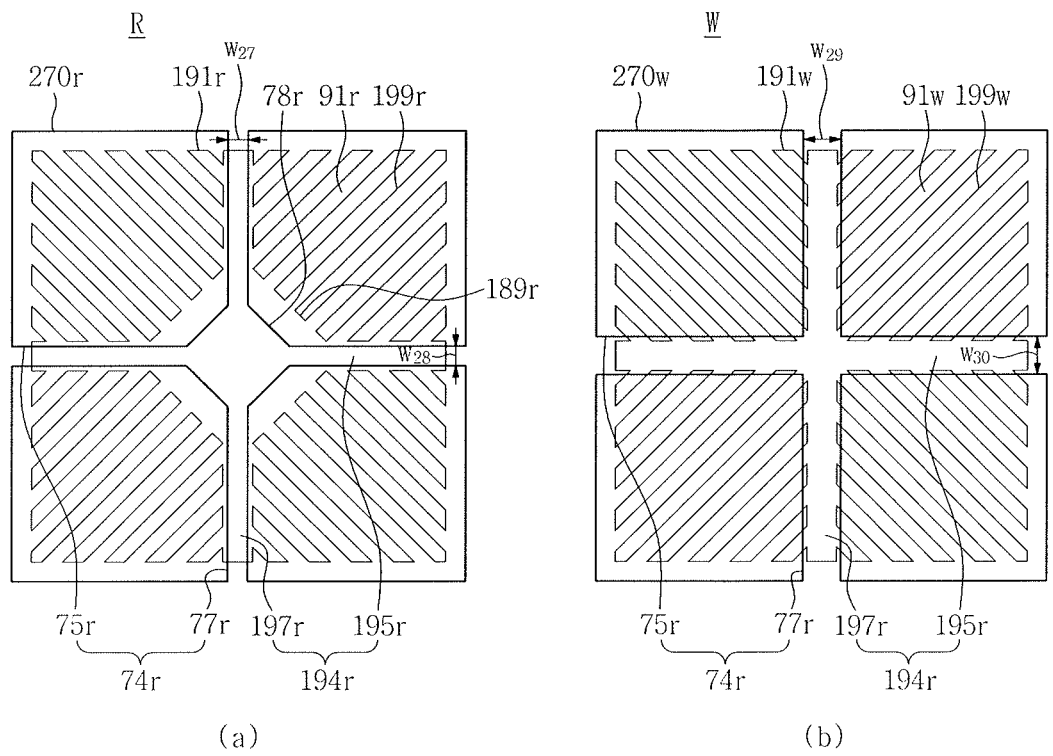
FIG. 24 illustrates schematic plan views of a first pixel electrode and a fourth pixel electrode, along with a common electrode, according to an eleventh exemplary embodiment.

FIG. 24 illustrates schematic plan views of a first pixel electrode 191r and a fourth pixel electrode 191w, along with a common electrode 270, according to the eleventh exemplary embodiment.

Similarly to the first exemplary embodiment, first, second, and third pixel electrodes 191r, 191g, and 191b are disposed in a red pixel R, a green pixel G, and a blue pixel B, respectively, and the fourth pixel electrode 191w is disposed in a white pixel W. Structures of respective ones of the first, second, and third pixel electrodes 191r, 191g, and 191b are the same as one another and different from a structure of the fourth pixel electrode 191w. Accordingly, the first pixel electrode 191r will be described in comparison with the fourth pixel electrode 191w, for ease of description.

According to the eleventh exemplary embodiment, an overall planar area of the fourth pixel electrode 191w and the common electrode 270 corresponding thereto is less than an overall planar area of one of the first, second, and third pixel electrodes 191r, 191g, and 191b and the common electrode 270 corresponding thereto.

For example, referring to FIG. 24, structures of the first, second, third, and fourth pixel electrodes 191r, 191g, 191b, and 191w according to the eleventh exemplary embodiment are the same as structures of the first, second, third, and fourth pixel electrodes 191r, 191g, 191b, and 191w according to the first exemplary embodiment, respectively. Accordingly, similarly to the first exemplary embodiment, an overall planar area of the fourth pixel electrode 191w is less than each respective overall planar area of the first, second, and third pixel electrodes 191r, 191g, and 191b.

According to the eleventh exemplary embodiment, a planar area of an aperture 74w of the common electrode 270 corresponding to the fourth pixel electrode 191w is larger than a planar area of an aperture 74r of the common electrode 270 corresponding to the first pixel electrode 191r. For example, as illustrated in FIG. 24, a width w30 of a first aperture 75w of the common electrode 270 overlapping the fourth pixel electrode 191w and a width w29 of a second aperture 77w thereof are wider than a width w28 of a first aperture 75r of the common electrode 270 overlapping the first pixel electrode 191r and a width w27 of a second aperture 77r thereof.

That is, according to the eleventh exemplary embodiment, a planar area of the fourth pixel electrode 191w is reduced, while a planar area of the aperture 74w of the common electrode 270 is increased. Accordingly, an intensity of a fringe field is reduced and side visibility is improved in the white pixel W.

Hereinafter, an LCD device according to a twelfth exemplary embodiment will be described with reference to FIGS. 25 and 26. The same configurations as those of the first exemplary embodiment described above will be represented by the same reference numeral, and repeated descriptions will be omitted.

FIG. 25 illustrates a schematic cross-sectional view of the color filter 230 according to the twelfth exemplary embodiment. FIG. 26 illustrates a schematic plan view of the color filter 230 according to the twelfth exemplary embodiment.

Referring to FIGS. 25 and 26, the color filter 230 is disposed on the second passivation layer 180b and in the red pixel R, the green pixel G, and the blue pixel B. For example, a first color filter 230r may be a red color filter in the red pixel R, a second color filter 230g may be a green color filter in the green pixel G, and a third color filter 230b may be a blue color filter in the blue pixel B.

The color filter 230 is not disposed in the white pixel W, which is similar to the first exemplary embodiment. However, according to the eleventh exemplary embodiment, a color filter pattern 231 is disposed in the white pixel W, which is dissimilar to the first exemplary embodiment.

The color filter pattern 231 may include or be formed of a material the same as that included in one of the first, second, and third color filters 230r, 230g, and 230b. For example, in the case that a color of a screen leans toward yellow when viewed from the lateral side, the color filter pattern 231 may include or be formed of a material included in the third color filter 230b which is a blue color filter. Alternatively, in the case that a color of a screen leans toward red when viewed from the lateral side, the color filter pattern 231 may include or be formed of a material included in the first color filter 230r which is a red color filter.

In an exemplary embodiment, the color filter pattern 231 may have a column shape, and may include a plurality of color filter patterns 231 in the white pixel W. The color filter pattern 231 may have a planar area less than that of the white pixel W. Accordingly, the color filter pattern 231 may compensate for a step difference of the white pixel W, and as the step difference is compensated, side visibility may be improved. In an exemplary embodiment, the third passivation layer 180*c* may cover the color filter 230 and the color filter pattern 231.

By way of summation and review, a LCD device may have a pixel structure based on four colors, in which a white pixel is further provided to a pixel structure that is based on three colors, e.g., red, green, and blue, so as to achieve improved luminance and resolution. In such a LCD device, while a color filter is formed in an aperture of an insulating layer which is provided in each pixel, a white color filter may not be formed in a white pixel so as to improve process efficiency. Accordingly, the white pixel, as compared to the color pixels, may have a step difference due to the aperture of the insulating layer, whereby the distance "d" increases and the side visibility is degraded.

In contrast, in accordance with one or more of the aforementioned embodiments, an overall planar area of a pixel electrode or a common electrode corresponding to the white pixel is smaller than an overall planar area of a pixel electrode or a common electrode corresponding to each of the colored pixels. Therefore, the effective refractive index of the white pixel decreases, and the side visibility of the LCD device may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A liquid crystal display device, comprising:
    first, second, third, and fourth pixel electrodes, respectively corresponding to pixels of different colors, the fourth pixel electrode corresponding to a white pixel, and each of the first, second, third, and fourth pixel electrodes including a stem portion and a branch portion extending from the stem portion to define a plurality of domains;
    a common electrode opposing each of the first, second, third, and fourth pixel electrodes; and
    a liquid crystal layer between each of the common electrodes and a corresponding one of the first through fourth pixel electrodes, wherein:
    the stem portion includes first and second stem portions perpendicular to each other,
    the first, second, and third pixel electrodes include a central pattern having a central pattern area defined by a polygonal shape, wherein the stem portion of the first, second, and third pixel electrodes includes first stem portions and second stem portions that extend from vertices of the central pattern of the first, second, and third pixel electrodes, the first stem portions and the second stem portions being perpendicular to each other, and
    the fourth pixel electrode includes a central pattern having a central pattern area defined by an area of intersection of the first stem portions and the second stem portion of the fourth pixel electrode, such that the central pattern area of the fourth pixel electrode is less than the central pattern area of each of the first, second, and third pixel electrodes.

2. The liquid crystal display device as claimed in claim 1, wherein:
    the stem portion includes a first stem portion and a second stem portion, and
    an overall planar area of the first stem portion of the fourth pixel electrode is smaller than an overall planar area of the first stem portion of each of the first through third pixel electrodes.

3. The liquid crystal display device as claimed in claim 1, wherein:
    the stem portion includes a first stem portion and a second stem portion, and
    an overall planar area of the second stem portion of the fourth pixel electrode is smaller than an overall planar area of the second stem portion of each of the first through third pixel electrodes.

4. The liquid crystal display device as claimed in claim 1, wherein the stem portion includes a third stem portion connecting end portions of the first stem portion and the second stem portion to define an exterior of the first through fourth pixel electrodes.

5. The liquid crystal display device as claimed in claim 1, further comprising:
    a substrate including first, second, third, and fourth pixels on which the first, second, third, and fourth pixel electrodes are disposed, respectively;
    first, second, and third color filters in the first, second, and third pixels, respectively; and
    a color filter pattern in the fourth pixel, wherein
    the color filter pattern includes a same material as that included in at least one of the first, second, and third color filters.

6. The liquid crystal display device as claimed in claim 5, wherein the color filter pattern has a column shape, and has a smaller planar area than a planar area of the fourth pixel.

7. The liquid crystal display device as claimed in claim 1, wherein a distance between the fourth pixel electrode and the common electrode is greater than a distance between each of the first through third pixel electrodes and the common electrode.

8. The liquid crystal display device as claimed in claim 1, further comprising:
    first, second and third color filters in the first, second, and third pixels respectively; and
    an insulating layer on the first, second, third color filters, wherein
    a portion of the insulating layer is disposed between the first, second, third color filters and the first, second, third pixel electrodes, and
    the insulating layer overlapping the fourth pixel electrode has a step difference.

9. The liquid crystal display device as claimed in claim 1, wherein the ratio of a central pattern area of the fourth pixel electrode to the overall planar area thereof is smaller than a ratio of the central pattern area of one of the first, second, and third pixel electrodes to the overall planar area thereof.

10. The liquid crystal display device as claimed in claim 1, wherein a ratio of a total area of the stem portion of the fourth pixel electrode to an overall planar area thereof is different from a ratio of a total area of the stem portion of one of the first, second, and third pixel electrodes to the overall planar area thereof.

\* \* \* \* \*